(12) United States Patent
Jurt

(10) Patent No.: US 11,926,060 B2
(45) Date of Patent: Mar. 12, 2024

(54) TRANSPORT OF OBJECTS USING ROBOTS

(71) Applicant: Kabushiki Kaisha Toshiba, Tokyo (JP)

(72) Inventor: Marius Jurt, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 17/335,325

(22) Filed: Jun. 1, 2021

(65) Prior Publication Data
US 2022/0379479 A1    Dec. 1, 2022

(51) Int. Cl.
*B25J 9/16*    (2006.01)
*B65G 1/137*    (2006.01)

(52) U.S. Cl.
CPC ........... *B25J 9/1682* (2013.01); *B25J 9/1653* (2013.01); *B25J 9/1661* (2013.01); *B25J 9/1664* (2013.01); *B65G 1/1373* (2013.01)

(58) Field of Classification Search
CPC ...... B25J 9/1682; B25J 9/1653; B25J 9/1661; B25J 9/1664; B25J 9/1633; B25J 9/1679; B25J 5/007; B25J 9/0084; B65G 1/1373; G05B 2219/39329; G05D 2201/0216; G05D 1/0291; G05D 1/0287
See application file for complete search history.

(56) References Cited

U.S. PATENT DOCUMENTS

| | | | |
|---|---|---|---|
| 11,319,069 B1 * | 5/2022 | Lim | ................. G05D 1/106 |
| 2014/0228999 A1 | 8/2014 | D'Andrea et al. | |
| 2015/0045992 A1 * | 2/2015 | Ashby | .................. E02F 9/205 |
| | | | 701/2 |
| 2019/0039826 A1 | 2/2019 | Luckinbill et al. | |
| 2021/0065556 A1 * | 3/2021 | Aijaz | .................. G05D 1/0297 |
| 2022/0143653 A1 * | 5/2022 | Berger | ................ G05D 1/0291 |
| 2022/0291696 A1 * | 9/2022 | Tsushima | ............. B65G 1/1371 |
| 2022/0350319 A1 * | 11/2022 | Yoshida | .................. B66F 9/063 |
| 2022/0386395 A1 | 12/2022 | Aijaz et al. | |

OTHER PUBLICATIONS

Ohashi et al., "Realization of heavy object transportation by mobile robots using handcarts and outrigger", Robomech Journal 3(1), 27, 2016, 12 pages.

(Continued)

*Primary Examiner* — Abby Y Lin
*Assistant Examiner* — Dylan M Katz
(74) *Attorney, Agent, or Firm* — Oblon, McClelland, Maier & Neustadt, L.L.P.

(57) ABSTRACT

A method of transporting an object using a system comprising a plurality of robots. The method comprises one or more robots of the plurality of robots arranging themselves to each exert a respective transporting force on the object. Each of the one or more robots evaluates whether it satisfies a transport criterion while arranged to exert the respective transporting force on the object. If all of the one or more robots satisfy the transport criterion, the one or more robots exert the respective transporting forces on the object to transport the object towards a destination. At least one of the one or more robots evaluates whether it satisfies the transport criterion based on observations of other robots of the plurality of robots within its vicinity.

20 Claims, 7 Drawing Sheets

(56) References Cited

OTHER PUBLICATIONS

Gross et al., "Object Transport by Modular Robots that Self-assemble", Proceedings 2006 IEEE International Conference on Robots and Automation (ICRA), IEEE, 2006, 10 pages.
Gross et al., "Towards group transport by swarms of robots", International Journal of Bio-Inspired Computation, vol. 1, Nos. 1/2, 2009, 13 pages.
Wang et al., "Force-Amplifying N-Robot Transport System (Force-ANTS) for Cooperative Planar Manipulation without Communication", The International Journal of Robotics Research 35 (13), 2016, 24 pages.
Wang et al., "Kinematic Multi-Robot Manipulation with no Communication Using Force Feedback", 2016 IEEE International Conference on Robotics and Automation (ICRA), IEEE, 2016, 8 pages.
Teh et al., "Communication-based Formation Control of Mobile Robots: Modeling, Analysis and Performance Evaluation", Proceedings of the 23$^{rd}$ International ACM Conference on Modeling, Analysis and Simulation of Wireless and Mobile Systems, 2020, 5 pages.
Shahrokhi et al., "Object Manipulation and Position Control Using a Swarm With Global Inputs", 2016 IEEE International Conference on Automation Science and Engineering (CASE), IEEE, 2016, 7 pages.
Montemayor et al., "Decentralized Collaborative Load Transport by Multiple Robots", Proceedings of the 2005 IEEE International Conference on Robotics, IEEE, 2005, 6 pages.
Lindsey et al., "Cooperative Quasi-Static Planar Manipulation With Multiple Robots", International Design Engineering Technical Conference and Computers and Information in Engineering Conference, vol. 44106, 2010, 10 pages.
Su et al., "Decentralized Dynamic Control of a Non holonomic Mobile Manipulator Collective: A Simulation Study", Dynamic Systems and Control Conference, vol. 43352, 2008, 8 pages.
Rubenstein et al., "Collective Transport of Complex Objects by Simple Robots: Theory and Experiments", Proceedings of the 2013 International Conference on Autonomous Agents and Multiagent Systems, International Foundation for Autonomous Agents and Multiagent Systems, 2013, 8 pages.
Bluetooth SIG, Mesh Profile, version 1.0, Jul. 2017, 331 pages.

\* cited by examiner

TRANSPORT OF OBJECTS USING ROBOTS

FIELD

Embodiments described herein relate to methods, robots and systems for transporting objects using robots. In particular, embodiments described herein relate to methods, robots and systems for transporting arbitrarily shaped objects of unknown size using a system comprising a plurality of robots.

BACKGROUND

Robots are widely used in warehouses and distribution centres to perform transport, storage and retrieval of objects, with larger or heavier objects often requiring multiple robots to transport them.

An object of embodiments described herein is to safely lift and transport large and arbitrarily shaped objects towards target destinations using robots without prior knowledge of the objects' sizes or shapes, or of the number of robots required.

Arrangements of the embodiments will be understood and appreciated fully from the following detailed description, made by way of example only and taken in conjunction with the drawings in which.

Figure 10:
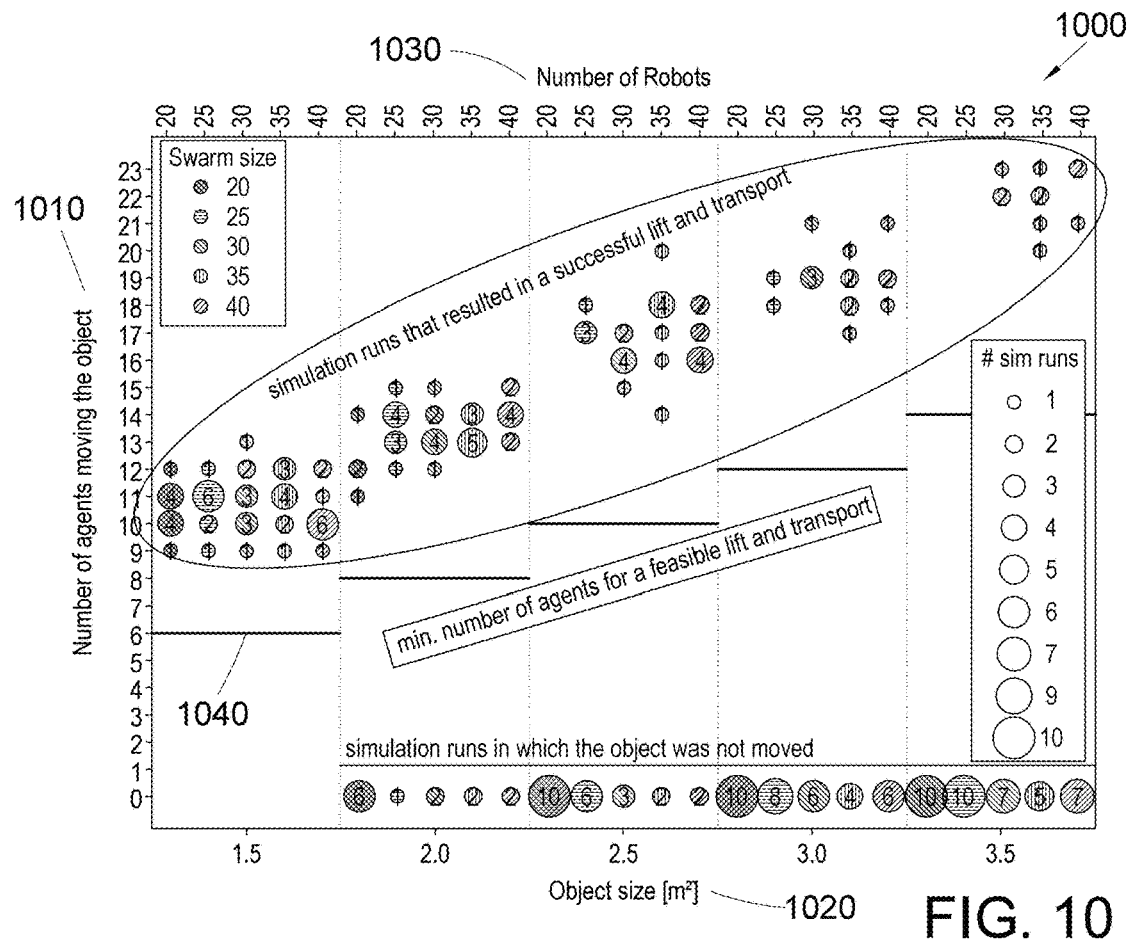
Figure 11:
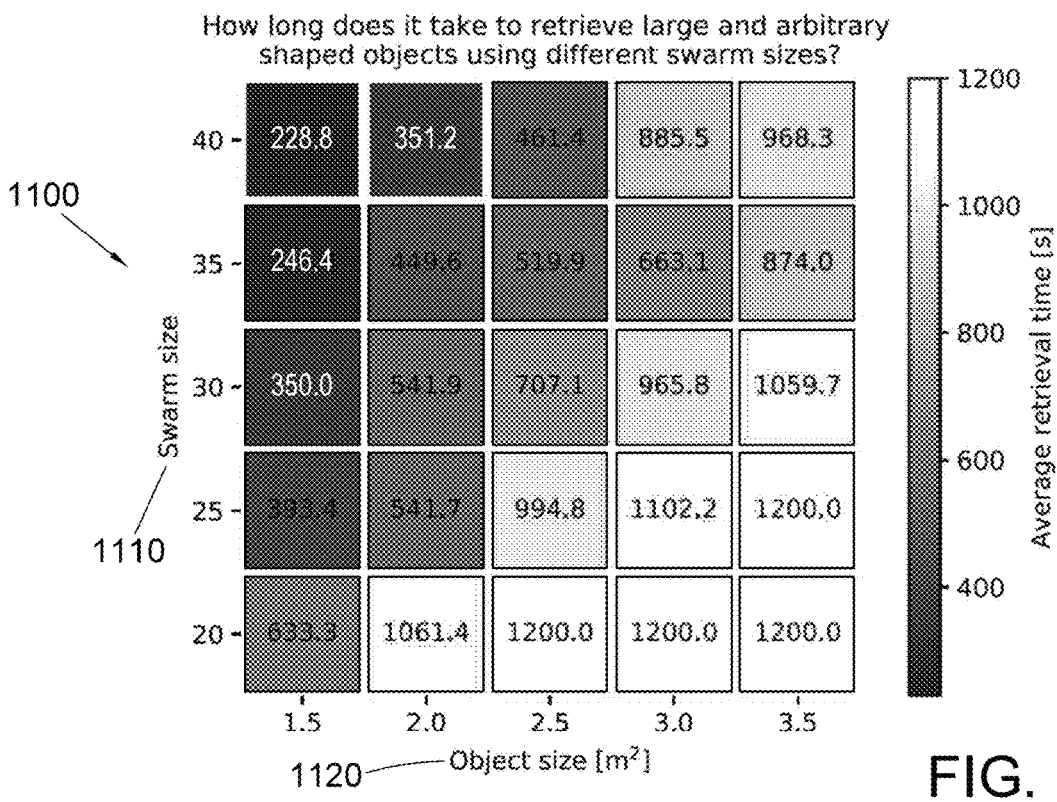

FIG. 10 is a graph showing numbers of simulations using different numbers of deployed robots and object sizes in which specific numbers of robots successfully transported the object and in which the object was not transported; and FIG. 11 is a graph of the average times taken for an object to be transported to a drop-off area in simulations using different combinations of object size and number of robots in a system.

DETAILED DESCRIPTION

According to an embodiment there is provided a method of transporting an object using a system comprising a plurality of robots, the method comprising: one or more robots of the plurality of robots arranging themselves to each exert a respective transporting force on the object; each of the one or more robots evaluating whether it satisfies a transport criterion while arranged to exert the respective transporting force on the object; and if all of the one or more robots satisfy the transport criterion, the one or more robots exerting the respective transporting forces on the object to transport the object towards a destination.

The one or more evaluating whether they satisfy a transport criterion based on observations of other robots in their vicinity advantageously allows them to do so without knowledge of the shape and size of the object. The method therefore allows the one or more robots to transport objects of unknown and/or arbitrary shapes and sizes.

In some embodiments, the one or more robots may be a set of the plurality of robots.

In such embodiments, the set of robots arranging themselves may comprise the set of robots distributing themselves in positions to exert respective transporting forces on the object based on the object's shape and size, and/or on observations of each other's locations.

In some embodiments, some, or all but the first of the robots to arrange themselves, do so in a position based on one or more observations of the location or locations of an adjacent robot or adjacent robots, wherein the one or more observations have been acquired independently by the individual robot.

In some embodiments, upon each of the set of robots evaluating that it satisfies the transport criterion, it may transmit a query message to other robots arranged to apply respective transporting forces to the object, each of which may respond indicating whether or not it satisfies the transport criterion.

In some such embodiments, the robot may transmit the query to all other robots arranged to apply respective transporting forces to the object and/or to all robots beneath and/or adjacent to the object.

In some embodiments, each of the one or more robots may evaluate whether it satisfies the transport criterion based on observations of the positions or movements of other robots of the plurality of robots.

In some embodiments, the one or more robots arranging themselves may comprise each of the robots positioning themselves beneath the object to lift the object, and the one or more robots exerting the respective transporting forces on the object may comprise the robots lifting and carrying the object.

In some such embodiments, each of the one or more robots may satisfy the transport criterion if it is at least one of: sufficiently surrounded by other robots underneath the object, or sufficiently close to an edge of the object.

In some embodiments, the one or more robots are a set of robots, and a, or each, robot of the set of robots may satisfy the transport criterion if at least a pre-set number of other robots of the set of robots are positioned within a threshold distance from the robot of the set of robots.

In some embodiments, a robot of the one or more robots satisfies the transport criterion if at least a pre-set number of other robots of the plurality of robots that have not moved underneath the object move within a threshold distance of the robot of the one or more robots.

In some embodiments, the one or more robots arranging themselves may comprise a first robot of the set of robots positioning itself to exert the respective transporting force on the object, and each subsequent robot of the set of robots positioning itself to exert the respective transporting force on the object within a threshold distance of one or more robots of the set of robots that have already positioned themselves underneath the object.

In some embodiment, each subsequent robot of the set of robots may move randomly underneath, or along an edge of, the object until they move within, and position themselves within, a threshold distance the one or more already positioned robots.

In such embodiments, the first robot may position itself immediately upon moving into a position to exert the respective transporting force to the object.

In some embodiments, if at least one of the one or more robots does not satisfy the transport criterion, the one or more robots do not exert respective transporting forces on the object to transport the object towards a destination.

In some embodiments, if the one or more robots do not all satisfy the transport criterion at a pre-set time after a first robot of the one or more robots arranges itself to apply the respective transporting force on the object, the one or more robots leave the object.

In some embodiments, the method may comprise the one or more robots moving within an environment until they identify the object before they arrange themselves to each apply the respective transporting force to the object.

In some such embodiments, some or all of the one or more robots may move randomly within the environment before they identify the object. In some such embodiments, the one or more robots may move within the environment until they move under the object and identify the object as the object to be transported.

According to an embodiment, there is provided a robot comprising a processing means, one or more non-transitory storage media, a drive, a force exerting mechanism, wherein the non-transitory storage medium comprises computer instructions executable by the processing means, the computer instructions when executed by the processing means causing the robot to: arrange itself using the drive to exert a respective transporting force on an object using the force exerting mechanism; subsequently evaluate whether it satisfies a transport criterion based on observations of other robots in its vicinity; communicate with any other robots that have arranged themselves to exert respective transporting forces on the object and determine whether all of the any other robots satisfy the transport criterion; if the robot and all of the any other robots satisfy the transport criterion, exerting the respective transporting force on the object to transport the object towards a destination.

In some embodiments, the robot may further comprise a radio or other communication means for communicating with the any other robots that have arranged themselves to exert respective transporting forces. The robot may comprise one or more sensors. The robot may observe other robots in its vicinity using one or more sensors comprised by the robot and/or using communications with the other robots using a radio or communication means comprised by the robot. The force exerting mechanism may be a lift mechanism.

In some embodiments, the computer instructions when executed by the processing means may further cause the robot to, if the robot satisfies the transport criterion, transmit a query message to any other robots arranged to exert respective transporting forces on the object; and to, if the robot receives a query message, respond indicating whether or not it satisfies the transport criterion.

In some embodiments, the robot arranging itself may comprise the robot positioning itself beneath the object to lift the object, and the robot exerting the respective transporting force on the object may comprise the robot lifting and carrying the object.

In some embodiments, the robot may satisfy the transport criterion if at least a pre-set number of other robots are positioned within a threshold distance from the robot.

In some embodiments, the robot may satisfy the transport criterion if at least a pre-set number of other robots of the plurality of robots that have not moved underneath the object move within a threshold distance of the robot.

In some embodiments, the robot arranging itself may comprise the robot positioning itself to exert a respective transporting forces on the object, and if one or more other robots are already positioned to exert respective transporting forces on the object, the robot may position itself within a threshold distance of one or more of the one or more other robots.

In some embodiments, the computer instructions when executed by the processing may further cause the robot to, if a pre-set time elapses after the robot arranges itself to exert the respective transporting force on the object, leave the object and to transmit a message commanding any other robots arranged to exert respective transporting forces on the object to leave the object.

In some embodiments the, the computer instructions when executed by the processing may further cause the robot to, move within an environment until it identifies the object before it arranges itself to apply the respective transporting force on the object.

The computer instructions when executed by the processing means may cause the robot to perform any of the optional features of the method described above.

According to an embodiment, there is provided a decentralised system comprising a plurality of robots as described above.

According to an embodiment, there is provided one or more non-transitory storage media comprising computer instructions executable by a processing means of a robot, the computer instructions when executed by the processing means causing the robot to: arrange itself to apply a transporting force on an object; subsequently evaluate whether it satisfies a transport criterion based on observations of other robots in its vicinity; communicate with any other robots that have arranged themselves to exert a transporting force on the object and determine whether all of the any other robots satisfy the transport criterion; if the robot and all of the any other robots satisfy the transport criterion, transport the object towards a destination.

The computer instructions when executed by the processing means may cause the robot to perform any of the optional features of the method described above.

Embodiments described herein relate to methods, robots, and multi-robot systems for transporting objects. The described embodiments may be advantageously employed in logistics operations, such as moving objects such as appliances, furniture, or gym equipment within environments such as warehouses, distribution centres, or other storage facilities. The embodiments may particularly advantageously be employed by small and medium sized enterprises (SMEs), which often cannot invest in a sophisticated centralised system.

Embodiments described herein may also be useable in a number of other situations, including logistics, agriculture, construction, mining, and/or disaster support situations. Embodiments may be used in environments such as factories, construction sites, mines or disaster areas, and/or may be used to move objects such as aeroplane parts, prefabricated construction items, mining machinery, or rescue equipment.

Figure 1:
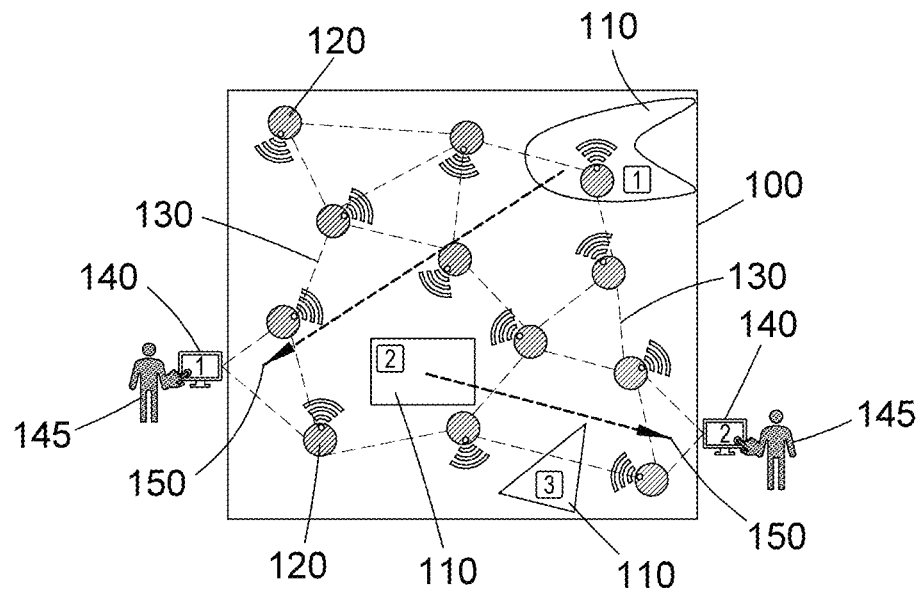
FIG. 1 shows an example of an environment and a decentralized multi-robot system for transporting objects therein.

FIG. 1 shows an example of an environment 100 with an example embodiment of a decentralised multi-robot system configured to transport objects therein.

The example environment 100 shown in FIG. 1 is an enclosed environment, such as a warehouse. However, it will be appreciated that embodiments of decentralised multi-robot systems described herein may be used in other non-enclosed environments within which robots are free to move and transport objects.

A plurality of objects 110 that may need to be transported are located within the environment 100. Embodiments of systems described herein advantageously do not require the objects 110 to be of any particular size or shape, or to be at any specific locations; the size, shape and locations of the objects 110 may advantageously not need to be known to the multi-robot system and/or to the robots thereof. The objects 110 are preferably rigid. FIG. 1 shows three examples of such objects 110 within the example environment 100.

In certain embodiments, in which objects 110 are to be transported by lifting and carrying them, the objects 110 may be arranged such that robots 120 of the decentralised multi-robot system are able to position themselves (and preferably to move) underneath them. The objects may therefore preferably at least partially elevated above a surface on which the robots move, such as a floor of the environment 100. Some or all of the objects 110 may be supported by, attached to, and/or comprise stilts, legs, platforms, pallets and/or other supporting means that elevate said objects above a surface and allow a robot 120 to position itself beneath the object.

A decentralised multi-robot system comprising a plurality of robots 120 is configured to transport the objects 110 in the environment. Each robot 120 is configured to move within environment (for example, with a random walk), find objects 110 to be transported (for example, by identifying such objects 110 when passing by or under them), arrange itself to transport such objects 110 (for example, underneath or adjacent and edge of an object 110), and evaluate whether it satisfies a transport criterion requirements (for example, whether it is part of a well distributed cluster of robots 120 under an object 110). The robots 120 are configured to collectively determine when all of one or more robots 120 arranged to transport an object 110 satisfy a transport criterion and to collectively transport such an object towards a destination (for example, by lifting and carrying an object 110 to a drop-off location).

The robots 120 are preferably configured to communicate with each other. The plurality of robots 120, and optionally one or more other devices (such as computing devices configured to generate or receive requests for objects 110) may define, and/or be connected to each other via, a mesh network 130. Some or all of the robots may dynamically connect to each other when within each other's communication range, for example, using off-the shelf radios. The mesh network 130 may advantageously be maintained by transceivers or radios of the robots 120 (and optionally other computing devices 140), without requiring any pre-existing wireless infrastructure within the environment 100.

The multi-robot system is decentralised, with no central controller or other means controlling or defining the behaviour of the plurality of robots 120. Each individual robot preferably operates based on local information and/or interactions (such as the detected presence of objects 110 and/or other robots 120) which it may obtain itself and/or which may be processed locally. Each robot 120 may make its own decisions and execute only those decisions. In some embodiments, each of the robots of the multi-robot system may operate according to the same computer instructions.

In some embodiments, instructions may be transmitted to robots 120 of the multi-robot system. However, such instructions are preferably not robot-specific, and identical instructions may be transmitted to all of, a plurality of, and/or or a subset of, the robots 120 of the system. Such instructions may specify one or more objects for the receiving robots to transport and optionally destinations 150 for such objects. Such instructions may be propagated to and between robots, for example using a mesh network 130 interconnecting the robots 120, which may be dynamically maintained.

The plurality of robots 120 acting in a decentralized manner may advantageously give rise to emergent complex and/or coordinated behaviour. The plurality of decentralized robots 120 may define a robot swarm, in which the robots 120 are decentralised and self-organised such that complex collective behaviour emerges from simple local interactions of the robots 120 with each other and/or the environment 100. Each of the plurality of robots 120 may be programmed with the same behaviour (for example, may have the same computer instructions deployed thereto).

Decentralized robots can advantageously be low-cost robots with limited on-board capabilities and decentralized systems are advantageously highly scalable to account for different scales of environments and objects to be transported.

The decentralised multi-robot system may comprise, and/or may be configured receive requests from, one or more computing devices 140 that are configured to generate or receive requests (such as requests for certain objects 110 to be transported, optionally to specific destinations). Such devices 140 may be configured to generate requests themselves, to receive requests via remote transmissions, or to receive requests from users' inputs. Such computing devices 140 may be user devices, computers, mobile devices, tablet computers, servers, transceivers or other suitable devices. In some embodiments, any of the robots 120 may be configured to receive such requests from any suitable device (such as a suitably configured mobile device) in communication range. Such requests may be propagated to all of the robots 120 of the decentralised multi-robot system 100 from the one or more robots by which they are originally received; for example, using a mesh network 130 as described above.

In some embodiments, the number of robots in a decentralized multi-robot system, or the number of robots of such a system that are active may be varied. For example, such a number of robots may be varied dynamically in response to the number of robots in the system that are in different states. Such different states may include having found an object, being positioned to exert a transporting force on an object (for example arranged at, underneath, and/or next to an object, preferably in some locally optimal way, or transporting an object (for example, carrying, pushing, or pulling an object).

In the example illustrated in FIG. 1, a decentralised system comprises twelve robots 120. A mesh network 130 interconnects the robots and connects them to two computing devices 140, with which users 145 request specific objects 110 be delivered to specific destinations 150, which in the illustrated example are each adjacent the computing device with which the request is made.

Decentralised multi-robot systems as described above system may advantageously be scalable (allowing additional robots to be deployed in response to changing situations or growth of a business) and may not require any existing wireless networking infrastructure. Decentralised multi-robot systems may advantageously be configured to operate in unstructured, unknown and even dynamically changing environments, due to their fully decentralised and reactive control schemes.

Figure 2:
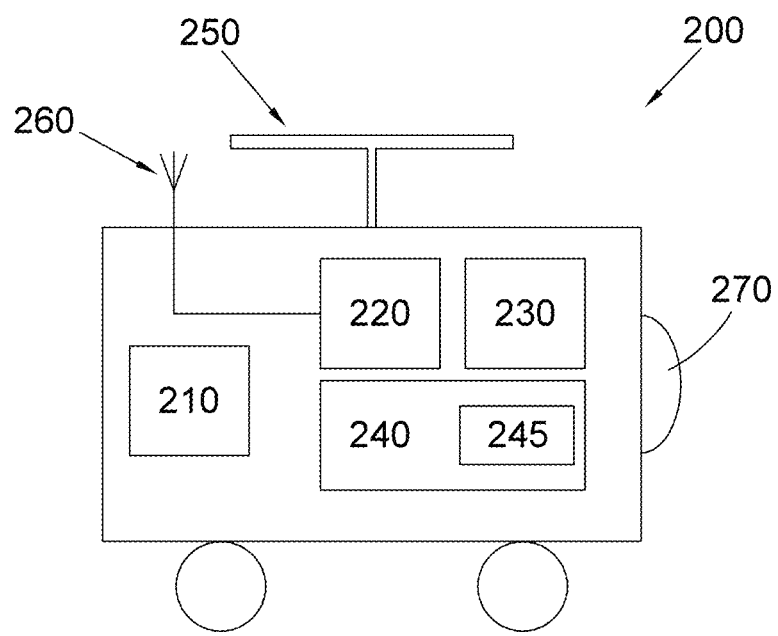
FIG. 2 shows an example of a robot for a transporting objects.

FIG. 2 shows an example of a robot 200 that may be used by a decentralised multi-robot system. The robot 200 comprises a drive means 210, a wireless input/output means 220 connected to an aerial 260, a processing means 230, a memory 240 comprising computer instructions 245, sensing means 270, and a mechanism 250 for exerting a transporting force on an object. Each of the robots 200 comprised by a decentralised multi-robot system may be substantially identical and/or relatively simple.

The drive means 210 controls the movement of the robot 200. The drive means 210 may an omnidirectional and/or holonomic drive means, or may otherwise allow the robot 200 to turn in place. The robot 200 may be round (for example, substantially cylindrical), which in addition to having an omnidirectional and/or holonomic drive means 210 may advantageously allow the robot to escape from narrow passages, obstacles or potential congestion. In some embodiments, the robot 200 may comprise a compass (such as a digital compass) or other means configured to enable it to determine its direction of movement.

The wireless input/output means 220 connected to the aerial 260 allows the robot 200 to transmit and receive messages, such as a query as to whether a robot 200 satisfies transport criterion or a response thereto. The wireless input/output means 220 may be used to connect the robot 200 to other robots and/or computing devices in a mesh network as described above. In some embodiments, each robot 200 may be associated with a unique ID for wireless communication.

The processing means 230, which may be a microprocessor, is configured to execute the computer instructions 245 that are stored in the memory 240 (which may be a non-volatile memory) to cause the robot 200 to perform method steps described herein. Each of the plurality of robots 200 of a decentralised multi-robot system may comprise the same computer instructions 245.

The sensing means 270 allows the robot to sense its environment, for example, to identify objects to be transported, obstacles and/or other robots. The sensing means 270 may operate under control of the processor 230. The sensing means may comprise one or more image generating sensors such as cameras, infrared sensors, lidar sensors, and/or other proximity sensors. The sensing means may comprise one or more upwards facing sensors, which may be configured to sense whether the robot 200 is under an object and/or to identify an object that the robot 200 is beneath.

In some embodiments, the processor 230 may be configured to perform multi-sensory data fusion to derive different types of information from the sensing means, such as distances between objects, distances to objects from the robot 200, distances to other robots 200 from the robot 200, relative directions to other robots 200 from the robot 200, and/or an orientation of the robot 200 within or relative to its environment. The use of such sensing means and data processing may eliminate the need for a global coordinate system for the robots 120.

In the illustrated robot 200, the mechanism 250 for exerting a transporting force on an object is a lift means 250 for lifting and carrying an object. Alternatively, or additionally, the mechanism 250 may be or may comprise a grabbing mechanism, attachment mechanism, and/or pushing mechanism.

The lift means 250 may be or may comprise a vertically extendable lifting platform on a top surface of the robot 200 or other means for lifting an object beneath which the robot 200 is positioned. Lifting and carrying an object is more energy efficient than pushing such an object. However, lifting and carrying an object with a plurality of robots requires the plurality of robots to be sufficiently well distributed beneath the object to ensure that the object is stable. Therefore, in embodiments described herein configured to lift and carry an object, a plurality of robots may arrange themselves beneath an object to be transported and may each determine whether they satisfy lift criteria before attempting to lift and carry the object. Such lift criteria may be satisfied if the plurality of robots beneath the object span the footprint the of the object. This is if all of the robots 200 beneath the object satisfy the lift criterion they may collectively lift and carry the object towards a destination.

In some embodiments, the lift means 250 and/or other mechanism 250 for exerting a transporting force on an object may be configured to attach to the object. For example, the lift mechanism 250 may attach to an object being carried in order to ensure that the object does not slide off the lift platform 250 while it is being carried if there is insufficient friction between them.

Figure 3A:
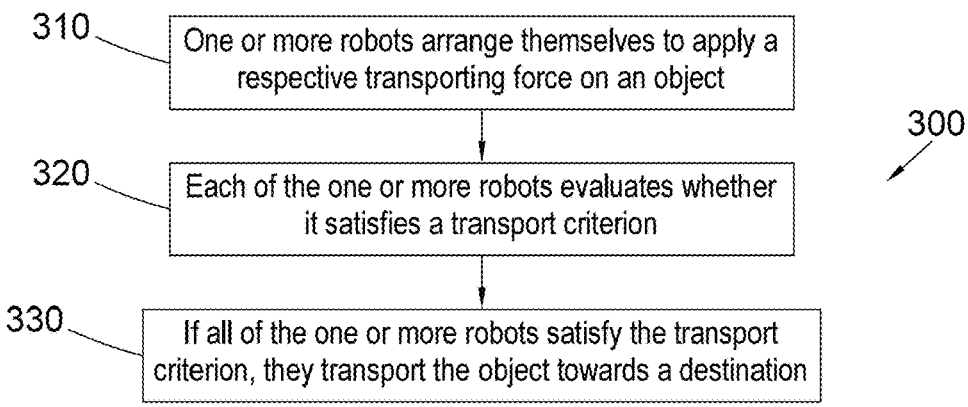
FIG. 3a is a flowchart of an embodiment of a method for transporting an object.

FIG. 3a is a flowchart of an embodiment of a method 300 for transporting objects using a multi-robot system comprising a plurality of robots, such as a plurality of decentralised robots and/or a multi-robot system as described above.

In a first step 310 of the method 300, one or more of the plurality of robots arrange themselves to each apply a respective transporting force to an object to be transported.

In some embodiments, the first step 310 may comprise the one or more robots searching for, finding, and arranging themselves relative to, the object to be transported. A robot searching for an object may comprise the robot moving within an environment (or a designated area thereof) until it encounters the object and identifies it as an object to be transported, which may be described as finding the object.

The movement within the environment of some or all of the one or more robots before they encounter the object may be random; for example, the robots may move using a random walk, such as a random walk as described below with reference to FIGS. 4a and 4b. In preferred embodiments, all of the plurality of decentralized robots may move randomly within the environment until they find an object to transport. Random movement may advantageously allow the robots to be used in any layout of an environment without modification, including dynamically changing environments or layouts thereof.

Alternatively, or additionally, robots may move partially or entirely on pre-set paths, to or between specific locations at which an object to be transported is expected to be located, in response to sensing their environment and/or objects therein, in response to communications from other robots (such as other robots that have found the object), and/or based on stored knowledge of the environment and/or the locations of objects therein.

In some embodiments, a first robot of the one or more robots may move randomly while until it finds the object (and/or arranges itself to apply a respective transporting force to the object), after which it may communicate to other robots that it has found the object. Subsequent robots of the one or more robots to move underneath the object may move to object partially or entirely based on the content and/or parameters of communications transmitted by the first robot, for example based on a received signal strength indicator of communications transmitted by the first robot. Such communications may be transmitted frequently, regularly and/or substantially continuously by the first robot, for example as part of maintaining a mesh network between the plurality of robots.

In some embodiments, an object may be encountered by a robot when that robot passes beneath the object, for example on a step of a random walk, at which point it may detect the object, for example using an upward facing sensor. Alternatively, or additionally, an object may be encountered by a robot when it detects an object using one or more of its sensors without moving underneath the object.

In some embodiments, the robots are configured to avoid collisions between each other. For example, robots may be configured not to move within a minimum distance (such as 0.4 meters) of each other, and/or may be configured to not move any closer to other robots that they determine they are within such a minimum distance of.

Random movement of some or all of the robots may be implemented using subsumption architecture, which may also implement collision avoidance. For example, a subsumption architecture may comprise a lower layer that updates a heading direction with a random change within an angular range, for example, a ±50° range, and a higher layer that uses data from one or more distance or proximity sensors of the robot to determine whether the updated heading direction might result in a potential collision with a nearby object or other robot.

Figure 4A:
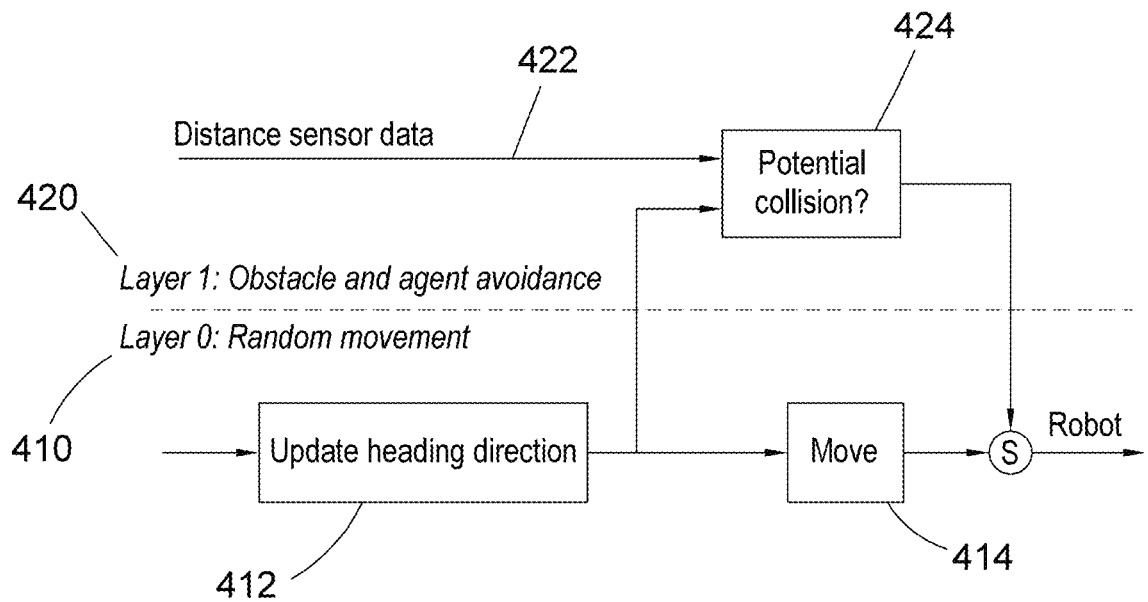
FIG. 4a shows a subsumption architecture for implementing a random walk of a robot.

FIG. 4a shows a two-layer subsumption architecture as described above, with a lower layer 410 configured to update a heading direction 412 and to move a robot 414 unless an upper layer 420 detects a possible collision 424 based on distance/proximity sensor data 422.

Figure 4B:
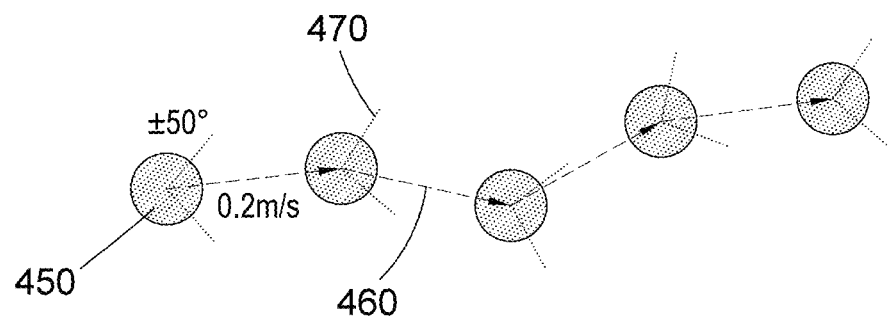
FIG. 4b is a diagram of an example of a robot moving in an environment using a random walk.

FIG. 4b shows an example of a robot 450 moving randomly within an environment using a random walk. As the robot 450 moves its heading is randomly updated such that it moves in a continuous sequence of steps 460 with different random headings, each with an equal pre-set duration, which is preferably short such that the robots move a small distance relative to the size of the robots between each heading change. For example, robots with diameters of 0.25 meters may move at a constant speed of 0.2 meters per second using a random walk with their direction being randomly updated every 0.05 seconds, such that they move in 0.01 meter steps). Each step 460 is performed with a random heading within a ±50° range 470 of the heading of an immediately preceding step 460.

After a heading is randomly determined, the robot 450 may determine whether a step 460 on that heading should be executed or should cancelled to avoid collisions or robots moving too close to each other. For example, the robot may determine that the step should be cancelled if travelling the pre-set distance on that heading would bring the robot closer to another robot within a threshold distance, or would result in the robot moving within a minimum separation distance from an obstacle or another robot. If the robot 450 determines that the step 460 should be cancelled, the step may not be performed and a new heading may be determined. In some embodiments, the new heading may be determined within the same ±50° range of headings 470, or in other embodiments, within an extended range of possible headings, or with any possible heading. After this new heading is determined whether it should be executed or cancelled is determined in the same manner as the preceding heading. If a threshold number of sequentially determined headings (such as 100 determined headings) are all cancelled, the robot may stop and not move, for example until an executable heading can be determined. Whether travelling a pre-set distance on a heading should be executed or cancelled may be determined using one or more distance and/or proximity sensors comprised by the robot 450. If Steps 460 may be taken at a pre-set rate. If a threshold number of determined headings In some embodiments, robots may identify that they have moved underneath an object, and/or that an object that they have moved underneath is an object to be transported using one or more upward facing sensors. For example, robots may determine that they have moved underneath an object using one or more upward facing distance or proximity sensors, and/or may identify an object using one or more upward facing optical sensors detecting a machine-readable marking on the object such as a barcode or QR code. Alternatively, or additionally, the robots may identify an object using radio-frequency identification (RFID tags), and/or other radio or contactless beacons. It will be appreciated that if the one or more robots are a set of robots, they may move underneath and/or find the object at different times.

In other embodiments, robots may identify an object as an object to be transported without moving underneath the object, for example using one or more sensors thereof. In such embodiments in which the robots are configured to lift and carry the object, such robots may move underneath the object after identifying it in this manner. In other such embodiments, such robots may arrange themselves adjacent an edge of the robot such that they are arranged to exert respective transporting forces on the object (for example, such that they are arranged to push or pull the object).

The number of robots that find, that move underneath and/or that arrange themselves to exert respective transporting forces on the object may depend upon the size, shape and/or weight of the object. The one or more robots may be multiple robots, or a set of robots, of the plurality of robots comprised by a multi-robot system. In some embodiments, the one or more robots may be a set of robots unless the object is too small to be transported by multiple robots. For example, if the object is too small for multiple robots configured to lift and carry objects to move underneath the object (for example, without a collision occurring).

The object that is found by the one or more robots may be one specific object that is to be transported and/or for which the plurality of robots are searching. Each object may be identified by a unique ID, which may allow a request to specify an object to be transported and with which robots may identify the object. Alternatively, the object may be any of a plurality of such objects (for example, any of a plurality or objects that unfulfilled requests for have been communicated to the decentralized multi-robot system). In embodiments in which the multi-robot system is searching for a plurality of objects, each robot may perform the steps of the method 300 with any of the plurality of objects that it finds, after which it may resume searching for any remaining objects of the plurality of objects that have not yet been transported. In alternative embodiments, some or all of the robots may be assigned to specific subsets of the objects to be transported, in which case they may perform the steps of the method with the first object of their assigned subset that they find.

It will be appreciated that multiple objects may be transported by a multi-robot system using a method as described herein, simultaneously using different subsets of the robots and/or successively using potentially overlapping sets of robots. The system may generate or receive requests for multiple objects, and each of the robot may search for one, some or all of the requested objects until it identifies one of them and arranges itself to transport it.

In some embodiments, the plurality of robots may also move randomly within the environment when not searching for objects (for example, before any requests are received and/or after any requests are fulfilled), during which it may store data on the locations of identified objects and/or the layout of the environment. Alternatively, some or all of the robots may idle until one or more requests for an object to be transported is made and/or after all issued requests are completed.

Requests for objects to be transported may be transmitted to any one or more robots of the plurality of robots. Such requests may be propagated from one or more robots that initially receive the request (such as one or more robots within range of range of a user's mobile device that transmits a request) to all other robots of the system, for example using a mesh network interconnecting the robots and/or a flooding protocol. All robots to which the request is transmitted and/or propagated may search for any one or more objects specified in the request. After one or more robots transport an object to a destination, and/or start to do so (for example, when one or more robots pick up the object), in a third step 330 of the method described below, one or more of the one or more robots may transmit a message to stop other robots searching for said object. Such a message may be propagated to the other robots of the system.

In some embodiments, requests may specify destinations to which objects are to be transported (such as coordinates, areas, or a selection of one or more of a plurality pre-set destinations). In other embodiments, a destination may be determined by robots transporting the object, or only a single pre-set destination (such as a drop-off area) may be available.

In some embodiments, the one or more robots arranging themselves to each apply a respective transporting force to the object may comprise each of the one or more robots positioning themselves relative to the object. In some embodiments (such as embodiments in which the robots are configured to lift and carry the object), the one or more robots may position themselves under the object. In other embodiments (such as embodiments in which the robots are configured to push or pull the object or lift it from the side/along the edge), the one or more robots may position themselves along the edge of the object.

In embodiments in which the one or more robots are a set of robots, the set of robots preferably distribute themselves underneath the object or along the edge of the object, preferably based on each other's locations and/or observations thereof.

The set of robots may distribute themselves underneath the object or along the edge of the object in some optimal way. For example, in embodiments in which the set of robots position themselves under the object to lift and carry the object, the robots may distribute themselves in a cluster spanning the majority, or substantially all of the footprint of the object.

In preferred embodiments, if the one or more robots that position themselves are a set of robots, they do so in a substantially uniform distribution, preferably with separations between adjacent positioned robots within a pre-set range.

In embodiments in which the robots position themselves under the object, each robot that positions itself may position itself as part of a cluster with any previously positioned robots under the object.

The first of the one or more robots that finds the object may position itself immediately upon moving under or adjacent to the object. Alternatively, such a first robot may move, either randomly, or directly, to an optimal position under or along an edge of the object, such as beneath a centre of mass of the object. Such a location may be identified, for example, through a radio beacon or RFID tag that is attached to the object. This first robot may transmit a message to other robots specifying that it has found the object. Such a message may specify the identity of the object. The information of the message may be propagated between robots, preferably to all robots of the system, for example via a mesh network interconnecting the robots as described above.

Subsequent robots that find the object are preferably aware that at least the first robot has already found the object, for example due to receiving a message as described above (or having received such a message within a pre-set preceding time window). Such subsequent robots may find one or more previously positioned robots under or adjacent the object and may position themselves upon doing so. For example, such subsequent robots may move randomly within the area beneath the object or along an edge of the object until they find one or more previously positioned robots and/or may stop and position themselves upon coming within a threshold distance of such a previously positioned robot. This may result in robots that find the object forming a cluster of positioned robots under the object or a line of positioned robots along the perimeter of the object, with the cluster or line growing as additional robots find the object, then find the cluster or line and stop and position themselves as part of it.

The threshold distance may be pre-set or dynamically determined, for example, based on the mass per footprint area or perimeter length of the object. Objects with a greater mass per footprint area may require a greater density of robots in a cluster beneath it to be safely lifted and consequently may require a lower threshold distance. Similarly, objects with a greater mass per footprint perimeter length may require a greater density of robots in a line adjacent to be safely pushed and/or pulled and consequently may require a lower threshold distance. The threshold distance within which robots arrange themselves with respect to each other may be specified in the request for the object, and/or may be automatically derived from the identity, mass, footprint area, and/or footprint perimeter of the object and lifting capacities of the robots.

In embodiments described above, after a first robot finds and positions itself under or adjacent an object and transmits a message indicating that it has done so, subsequent robots that find the object find the first robot, or a cluster or line of robots comprising the first robot, before positioning themselves under or adjacent the object in such a cluster or line. These subsequent robots may thereby position themselves in a cluster or line with the first robot without having to exchange any further communications, thereby being passively recruited to transport the object. Such passive recruitment, which does not require the robots to coordinate with each other, may advantageously allow simpler and/or lower cost robots to be used to transport objects and does not require robots to know the size shape or position of objects that they are recruited to transport.

Alternatively, or additionally, after a first robot has found the object, one or more additional robots may be actively recruited to join the cluster or line and/or to collectively transport the object. For example, additional robots could be attracted by one or more of the robots that have already found the object using the Received Signal Strength indicator (RSSI) of their radios. Active recruitment in this manner may require more complex or expensive robots, but may advantageously result in sufficient robots to transport an object being recruited sooner.

One, some or all of the robots may identify other robots that have found the object (such as previously positioned robots) and/or their distance or location relative to such robots using sensors (such as optical sensors) comprised by said robots, and/or using inter-robot communications, such as communications via mesh network maintained between the robots.

In embodiments in which robots move and position themselves under the object, while moving beneath the object to find one or more previously positioned robots, the subsequent robots may continue to sense whether they are under the object (for example, using an upward facing proximity or distance sensor) so as to ensure that they do not move out from beneath the object. Any such robot that detects that it has inadvertently moved out from beneath the object, may change its direction of movement and move back beneath the object.

In alternative embodiments, a set of robots that find the object may distribute themselves in a well distributed arrangement spanning the footprint (or perimeter thereof) of the object using other suitable techniques based on each other's locations (which may be observed by and/or communicated between the robots). For example, each subsequent robot that moves under the object may position itself beneath or adjacent to the object as far as possible from any previously positioned robot beneath or adjacent to the object.

In alternative embodiments, robots that find the object may not position themselves in fixed positions under or adjacent the object, and may instead may continue to move under or along the edge of the object, for example, randomly, while evaluating transport criterion as described below.

In a second step 320 of the method 300, each of the one or more robots arranged to apply a respective transporting force to the object evaluates whether it satisfies a transport criterion. Satisfying such a transport criterion may allow the robot to determine whether it is arranged suitably to contribute to a safe transport of the object by the one or more robots. In doing so, each robot may assess its local readiness to contribute to safely transporting the object.

Each of the one or more arranged robots preferably evaluates whether it satisfies the transport criterion based on its own local observations. For example, each of the arranged robots may evaluate whether it satisfies the transport criterion based partially or entirely on observations of other robots, such as observations of other robots in its vicinity. In some embodiments, each of the arranged robots evaluates whether it satisfies the lift criterion based on observations of the positions and/or movements of other robots within its vicinity.

In some embodiments, each of the one or more positioned robots may evaluate the transport criterion based on the positions of one or more other robots positioned underneath or adjacent to the object relative to itself, the movement of one or more robots outside the footprint of the object relative to itself, the time that has elapsed since it positioned itself under the object, the number of robots that have moved and/or positioned themselves underneath or adjacent to the object, its position relative to the object and/or parts thereof, and/or other factors.

In some embodiments, each of the one or more positioned robots evaluates whether it satisfies any of, all of, or one or more specific subsets of a plurality of requirements of the transport criterion.

In some embodiments, each of the one or more arranged robots may satisfy the transport criterion if it is sufficiently surrounded by other positioned robots.

In some embodiments, in which the robots are configured to move under and position themselves under the object and to subsequently lift and carry the object, the transport criterion may be a lift criterion. In such embodiments, each of the one or more positioned robots may satisfy the lift criterion if it is either sufficiently surrounded by other positioned robots, or it is sufficiently close to an edge of the object. If all of a plurality of positioned robots satisfy either of these requirements, it may indicate that the plurality of positioned robots span the footprint of the object and can safely lift and carry the object without it tipping or falling over.

A robot may evaluate whether it is sufficiently surrounded by other positioned robots based on whether at least a threshold number of other positioned robots are located within a pre-set distance. For example, the threshold number of other positioned robots may be four and/or the pre-set distance may be 0.35 meters. This threshold number of robots may be at least three, at least four, or at least five. The pre-set distance is preferably greater than the distance at which robots position from each other to form a cluster, for example the pre-set distance may be at least 125%, or at least 150%, of the distance at which robots position from each other to form a cluster.

In embodiments in which the robots arrange themselves adjacent, rather than underneath, the object (for example, in which the robots are configured to push or pull, rather than carry, the object) the threshold number may be two. This may allow the robot to evaluate, whether it is in an intermediate position of a line of robots along an edge of the object.

In other embodiments, robots may utilise other requirements to evaluate whether they are sufficiently surrounded by other positioned robots. For example a robot may determine that it is sufficiently surrounded based on the angles to a plurality of other positioned robots within a threshold distance.

A robot positioned beneath an object may evaluate whether it is positioned sufficiently close to an edge of the object based on whether at least a threshold number of other moving robots (preferably moving robots that have not found the object) have moved to or within a pre-set distance of it since it positioned itself and/or within a preceding pre-set period. Such robots moving to or within the pre-set distance may be detected and/or identified using sensors of the criterion evaluating robot and/or using communications between the robots. The pre-set distance may be equal to or greater than a threshold distance used to avoid collisions between robots as described above. The lift-criterion-evaluating robot preferably only counts the number of unique robots that have moved to or within the threshold distance, for example by storing unique IDs of the robots that have moved to or within the threshold distance such that a single robot is not counted multiple times if it repeatedly moves to or within the threshold distance. For example, a positioned robot may determine that it is located sufficiently close to an edge of the object if five or more unique robots have passed within 0.4 meters of it since it has positioned itself.

Using this method to determine whether a positioned robot is at an edge of the object advantageously requires waiting for a period of time until the required number of moving robots happen to pass nearby the criterion-evaluating robot.

This waiting requirement prevents the first robot that finds the object and that positions itself at an edge of the object from immediately evaluating itself as satisfying the lift criterion and attempting to lift the object before any other robots find it. This could result in an unstable lift being performed if the object is not sufficiently light and small to be carried by a single robot. Such a first robot will not determine that it satisfies the lift criterion requirement of being sufficiently close to an edge of the object until the threshold number of moving robots have passed within the pre-set distance of it. If the threshold number is set sufficiently high, by this time, if the object is too large for a single robot to carry it one or more other robots will likely have found and positioned itself under the object, preventing the first robot from independently lifting the object.

Generally, this waiting requirement may ensure that robots positioning themselves at an edge of the cluster cannot instantaneously satisfy the lift criterion as they necessarily cannot be surrounded, and they cannot satisfy the edge requirement without waiting some time. This gives time for more robots to find the object if the footprint of the object if it is not completely spanned by the cluster. If the lift criterion requirements are sufficiently strict (for example, the number of moving robots that must pass within the pre-set distance for a robot to satisfy the close-to-an-edge requirement is sufficiently high) the probability of all of the robots within a cluster satisfying the safe to lift criterion before the robots span the footprint of the object falls to a negligible level.

Alternatively, or additionally, a robot positioned beneath an object may evaluate whether it is positioned sufficiently close to an edge of the object based on detections of the object itself and/or an edge thereof using sensors comprised by the robot.

Alternatively, or additionally, in some embodiments, satisfying the transport criterion (or a close-to-an-edge requirement thereof) for the first robot (and optionally, for the other robots) may additionally require that at least a minimum time has elapsed since that robot positioned itself. This may give advantages equivalent to the waiting requirement described above.

One, some or all of the robots may identify positioned or moving robots within distances and/or proximity of them using sensors (such as optical sensors) comprised by said robots, and/or using inter-robot communications, such as communications via mesh network maintained between the robots.

It will be appreciated that if the one or more robots are a plurality of robots, different robots of the plurality of robots may perform the steps of the first, second and third steps 310, 320, 330 described above in different orders. For example, an earlier robot may arrange itself relative to the object and/or evaluate whether it satisfies the transport criterion before a later robot finds, or arranges itself relative to, the object.

In a third step 330 of the method, if all of the one or more robots that have arranged themselves to apply respective transporting forces to the object satisfy the transport criterion, the positioned robots transport the object towards a destination.

In embodiments in which the robots are configured to move and position themselves under the object, this step may comprise the one or more positioned robots lifting and carrying the object towards a destination if all of the positioned robots satisfy lift criterion as described above.

In other embodiments, in which the robots arrange themselves adjacent to the object, this step may comprise the one or more arranged robots pushing and/or pulling the object towards the destination if all of the arranged robots satisfy transport criterion as described above.

In some embodiments, the one or more robots may transport the object if all of the one or more arranged robots satisfy any of, all of, or one or more specific subsets of a plurality of transport criterion requirements.

In some embodiments, upon each robot evaluating that it satisfies the transport criterion, that robot transmits a query to each other robot that has arranged itself to exert a respective transporting force on the object and these other robots transmit response specifying whether they have satisfied the transport criterion. In some such embodiments, the query may be transmitted to each other robot that has found the object, which may respond specifying whether they have arranged themselves and satisfied the transport criterion. The transmitted query may be received by and/or propagated to each of the robots to which it is transmitted.

If any of the robots to which the query is transmitted responds specifying that it has not satisfied the transport criterion (or that it has not arranged itself and satisfied the transport criterion), the robots do not then transport the object. The robot that transmitted the query will not transmit a transport command message and will instead wait for another robot to satisfy the transport criterion and transmit its own query message.

If all of the robots to which the query is transmitted as described above respond specifying that they have satisfied the transport criterion (or that they have arranged themselves and satisfied the transport criterion), the robot that transmitted the query message may transmit a transport command message to all of the robots that responded and/or to all of the robots arranged to apply respective transporting forces on the object. The transport command message may be received by and/or propagated to each of the robots to which it is transmitted (the robots arranged to transport the object) and these robots may then exert respective transporting forces on the object substantially simultaneously (for example, separated by only minor communication latency). For example, the robots may lift the object substantially simultaneously.

In some embodiments, the query may be transmitted to robots of the system other than the arranged robots. For example, the query may be transmitted or propagated to all of the robots of the system. This may advantageously allow the method to be performed without each robot that evaluates the lift-criterion to know which robots have arranged themselves to transport the object, which would require additional inter-robot communications. In such embodiments, only the robots that have positioned themselves under the object may respond to the query.

Figure 5:
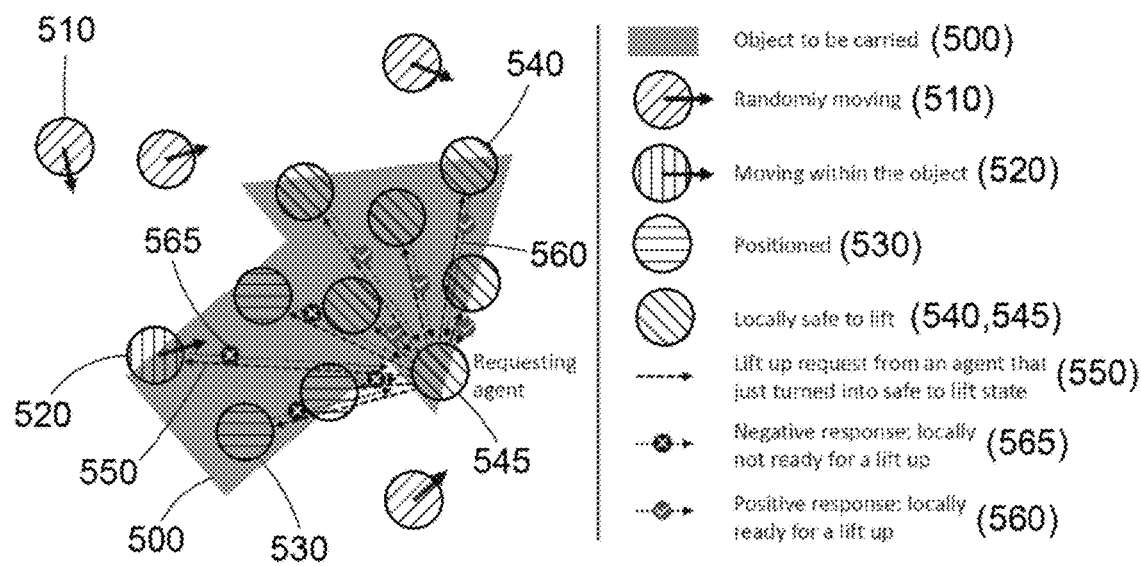
FIG. 5 is a diagram of an example of a plurality of robots searching for, finding, and positioning themselves in a cluster under an object, and exchanging a query and responses in dependence upon whether they have satisfied a lift criterion.

FIG. 5 shows an example of a plurality of robots 510, 520, 530, 540, 545 searching for, finding, and positioning themselves in a cluster under an arrow-shaped object 500, and exchanging a query 550 and responses 560, 565 in dependence upon whether they have satisfied lift criterion.

The robots 510, 520, 530, 540, 545 and the object 500 are shown at a point at which one of the robots 545 determines that it has satisfied the lift criterion and transmits a query message 550 that is received and responded to by each other robot 520, 530, 540 that has found the object 500.

Fourteen robots 510, 520, 530, 540, 545 are shown in FIG. 5. Four of the robots 510 are moving randomly within the environment searching for objects to transport. The remaining robots 520, 530, 540, 545 have previously moved into the footprint of the object 500 and identified it as an object to be transported, thereby finding the object 500.

As described above, the first of the robots 520, 530, 540, 545 that found the object 500 immediately positioned itself beneath the robot. Robots that subsequently found the object 500 moved randomly within the footprint of the object until they came within a threshold distance of a previously positioned robot 530, 540, at which point they positioned themselves, together defining a cluster of positioned robots 530, 540.

FIG. 5 shows the robots at a time where nine of the robots 530 have positioned themselves in a cluster spanning most of the footprint of the object 500 and one robot 520 has recently found the object 500 and is moving randomly beneath it.

As described above, after positioning themselves, the robots 530, 540 evaluate whether they satisfy the lift criterion, and upon satisfying the lift criterion, transmit a query message 550 to all of the other robots 520, 530, 540 that have found the object. The robots 540 that have satisfied the lift criterion transmit positive responses 560 to the querying robot 545 and the robots 520, 530 which have found the object 500 but have not yet positioned themselves beneath the object and satisfied the lift criterion transmit negative responses 565 to the querying robot 545. Consequently robots 520 that have found the object 500 but have not yet found the cluster of positioned robots 530, 540, 545 (which move randomly beneath the object 500) and robots 530 which have positioned themselves in the cluster beneath the object both transmit negative responses 565 to the querying robot 545.

FIG. 5 shows the point in time where one of the robots 545 transmits a query 550 upon satisfying the lift criterion. Five robots 540 that have previously satisfied the lift criterion transmit positive responses 560 to the querying robot 545. Three robots 530 that have positioned themselves but not yet satisfied the lift criterion, and the one robot 520 that has not yet positioned itself transmit negative responses 565 to the querying robot 545. Therefore, as not all of the robots 520, 530, 540, 545 that have found the object 500 have indicated that they have satisfied the lift criterion, the robots 520, 530, 540, 545 do not lift the object 500 at the point in time shown in FIG. 5. The querying robot 545 does not transmit a lift command and instead waits for the robots 520, 530 that have not yet satisfied the lift criterion to do so and to transmit their own queries 550.

In alternative embodiments for determining whether all of the robots have satisfied the transport criterion, robots may remember previous responses to query messages as described above. In such embodiments, query messages may only be sent to robots that have not previously responded positively to a preceding query message.

In some embodiments of the method 300 of FIG. 3a, if after a certain time period (such as a pre-set timeout period) from one of the robots (such as the first robot) finding and/or arranging itself relative to the object, the plurality of robots that have arranged themselves relative to the object (for example that have positioned themselves under the object) have not all satisfied the transport criterion, the robots may leave the object, which may comprise moving away from and/or out from underneath the object.

For example, each of the robots may, if a pre-set timeout period elapses after it arranges itself relative to the object, transmit a leave object message to all of the other robots that have found and/or arranged themselves relative to the object. The leave object message may be received by and/or propagated to each of the other that have found and/or arranged themselves relative to the object, which may then leave the object (for example, by moving out from beneath the object).

In some embodiments, the robots may leave the object by resuming moving randomly within the environment. In other, embodiments the robots may move away from or out from underneath the object based detections of their sensors and/or memories of the path by which the moved into or under the object. For example, robots near to the edge of an object may use detections of the edge of the object to move in a direction that will take them out from and/or away from the object. Such non-random movement of the robots leaving the object may result in the robots leaving the object faster.

After leaving the object, the robots may resume searching for objects as they did before they found the object, for example by moving randomly within the environment as described above. After the robots leave the object, an attempt to transport the object may be restarted by a new first robot finding the object. A timeout mechanism as described advantageously prevents robots becoming stuck in an ineffective transport attempt and frees them up to re-find the object or to find and transport other objects.

A pre-set timeout period may be more than five minutes, more than eight minutes, less than twenty minutes, less than fifteen minutes, and/or less than twelve minutes. For example, a pre-set timeout period may be ten minutes. In alternative embodiments, the timeout period may correspond to the identity of the object and/or may be contained within a request for the object.

In alternative embodiments, instead of all of the robots leaving the object after a time period elapsing, each individual robot may leave the object it has not satisfied the lift criterion after a pre-set time period has elapsed from that robot arranging itself relative to the object.

In some embodiments, the one or more robots may lift the object using lift platforms as described above with reference to FIG. 2. All of the robots having satisfied the lift criterion advantageously means that the plurality of lifting robots are arranged in a well distributed arrangement beneath the object (such as an arrangement that spans the footprint of the object) thereby preventing the object tipping when it is lifted and/or ensuring sufficient robots have been recruited to feasibly and safely lift and transport the object. In some embodiments, the plurality of robots that lift the object may releasably attach and/or engage with the object. When the plurality of robots lift the object, they may attach to the object.

After all of the one or more robots satisfy the transport criterion (and/or after they lift the object), the one or more robots transport (for example, carry) the object towards a destination. The destination may be a point or area, which may a single pre-set destination of the multi-robot system, one of a plurality of pre-set destinations of the system, or a location designated in the request for the object. In embodiments, in which the destination of one of a plurality of pre-set destinations, the destination may be designated in the request for the object, collectively decided and/or selected based on the locations of the robots and/or the object, selected based on the number of robots transporting the object, and/or selected randomly. Alternatively, the plurality of robots may transport the object in a pre-set or specified direction.

In some embodiments, the plurality of robots may transport the object in a direction towards the destination from the object's original location towards a destination. In some such embodiments, the robots may continue to move in this direction with the object until they are triggered to stop or to change direction as described below.

Figure 6:
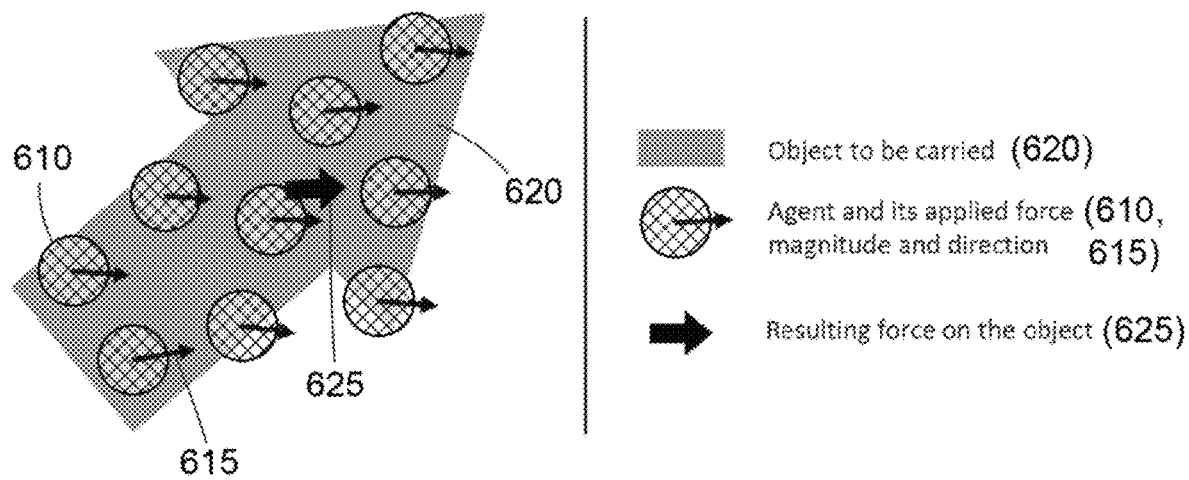
FIG. 6 is a diagram of a plurality of robots carrying an irregularly shaped object and the net force they exert on the object.

The robots advantageously may not need to communicate or coordinate their movement towards the destination. In some embodiments, each of the robots moves at a pre-set speed in a direction towards the destination, which it may determine. As shown in FIG. 6, a plurality of robots 610 beneath a rigid object 620 exerting generally parallel forces 615 upon that object 620 result in a net force 625 upon that object 620 in a direction generally parallel to the forces 615, irrespective of any complex shape of the object 620 and the arrangement of the individual robots 610. The translational velocity of an object 620 being moved by such a plurality of robots 610 is significantly greater than any rotational velocity due to different moments about the centre of mass of the object 620 of the individual robots 610.

In some embodiments, the destination and/or the directions in which robots move and/or exert forces upon the transported object may change dynamically, for example in response to detections of one or more of the robots or instructions from one or more external users or systems. Such changes in destination and/or directions may be transmitted and/or propagated between the plurality of object transporting robots, for example via a mesh network maintained between the robots as described above with reference to FIG. 1.

For example, if one of the plurality of robots transporting an object detects an obstacle, it may transmit a change of direction message to all of the other robots transporting the object that results in the robots changing the direction in which they are transporting the object. Such a change in direction may be carried out for a pre-set period or a period specified by the change of direction message, after which the robots may resume travelling towards the original destination until any further obstacles are detected and change of directions messages are transmitted.

When one, some, or all of the plurality of robots transporting the object reach the destination, they may stop and/or may put down the object. The plurality of robots may then leave object (for example moving away from and/or out from beneath the object) and/or may leave the destination (for example, if the destination is an area). After leaving the object and/or the destination, each of the plurality of robots may resume searching for objects to transport and/or moving randomly within environment.

In alternative embodiments, a set of robots transporting the object may communicate with each other in order to transport the object in substantially the same direction at the substantially same speed and/or to exert substantially equal forces on the object in substantially identical directions. In some such embodiment, the force or movement parameters may be decided by one or some of the robots and disseminated to the other robots of the set by inter-robot communications. In other embodiments, the robots may collectively determine the force or movement parameters. Such embodiments, may allow the object to be moved in a more coordinated and/or efficient manner.

In some embodiments, one, some, or all of the robots may detect that it has reached or entered the destination, or a sub region thereof.

In some embodiments the robots may be configured to detected that they have reached or entered the destination, or a sub region thereof using sensors, such as visual sensors, comprised by said robots, for example, by detecting one or more machine readable markings such as a QR code or barcode.

Alternatively or additionally, one, some, or all of the robots may detect that it has reached or entered the destination, or a specific area thereof by receiving a destination message, which may be transmitted in a destination area or a sub-area thereof. Such a destination message may be relatively short range and/or may be transmitted by a network host. For example, such a destination message may only be transmitted within a subsection of a drop-off area set back from one or more edges of the drop-off area. This may advantageously ensure that a robot has to travel sufficiently far into the drop-off area before receiving the destination message, ensuring that the object transported by the robot is carried sufficiently far into the drop-off area.

Alternatively, or additionally, one, some or all of the robots may detect that it has reached or entered the destination, or a specific area thereof by a received signal strength indicator (RSSI) of a destination message exceeding threshold. Such a destination message may be transmitted by a network host or other device at a destination, or by a device with which a request was made, which may itself define the destination.

In some embodiments, a single robot that determines that it has reached or entered the destination or a sub region thereof may transmit a stop message to all of the other robots transporting the object. The stop message may be received by and/or propagated to each of the other robots transporting the object and these robots may then stop applying respective transporting forces to the object substantially simultaneously (for example, separated by only minor communication latency).

In alternative embodiments, a robot that determines that it has reached or entered the destination or a sub region thereof may transmit a stop query message to all of the other robots transporting the object. The stop query may received by and/or propagated to each of the other robots transporting the object and these robots may then respond positively if they have determined that they have also entered or reached the destination, or sub region thereof, and may respond negatively if they have not. If the robot that transmitted the stop query message receives any negative responses it may continue to transport the object and may wait to receive subsequent query messages from other robots. If the robot that transmitted the stop query message receives only positive responses, this may indicate that it is the last of the object-transporting robots to determine that it has reached or entered the destination or sub-region thereof, and may transmit a stop command message to the other object-carrying robots. Such a stop command message may cause the other robots to stop transporting the object (to optionally put-down the object if they are carrying it) and to leave the object. This query response mechanism for determining if all of the robots have reached or entered the destination or sub-region thereof is equivalent to the query response mechanism used to determine if all of the robots have satisfied the lift criterion as described above, and may comprise any optional feature thereof. Such a query and response technique or other collective decision making techniques may allow the object to be transported more precisely or closer to a target location.

In embodiments in which a set of robots carry the object to the destination, the robots carrying the object may put down the object substantially simultaneously (for example, separated by only minor communication latency). The robots that receive the stop message may leave the object after putting it down, for example in the same manner as robots that receive a leave message as described above.

Methods as described above operate in a decentralized manner, in which robots are actively or passively recruited into a cluster or line, perform local readiness assessments, and reach a consensus as to whether sufficient robots are positioned to transport an object in a coordinated and safe manner. Such methods advantageously allow robots to transport objects without prior knowledge of their size or shape, including large and irregularly or non-traditionally shaped objects. For example, more robots may be recruited to span larger object footprints to safely lift and carry said objects.

Decentralized multi-robot systems configured to perform methods as described above are additionally advantageously robust and fault-tolerant, as one or more robots failing does not impact other robots' decentralized behaviour. Additionally, such systems are adaptable as they adapt to various object sizes and shapes and they can be deployed in environments of any shape or size within which the robots can move.

Further such systems do not require any existing infrastructure, allowing them to be deployed in an out-of-the-box manner. The number of robots in the system can be adjusted based on the size of the environment to be covered, and/or maximum sizes of objects to be transported, and/or based on retrieval demand and/or overall efficiency without requiring any adjustments, thereby providing scalability.

Figure 3B:
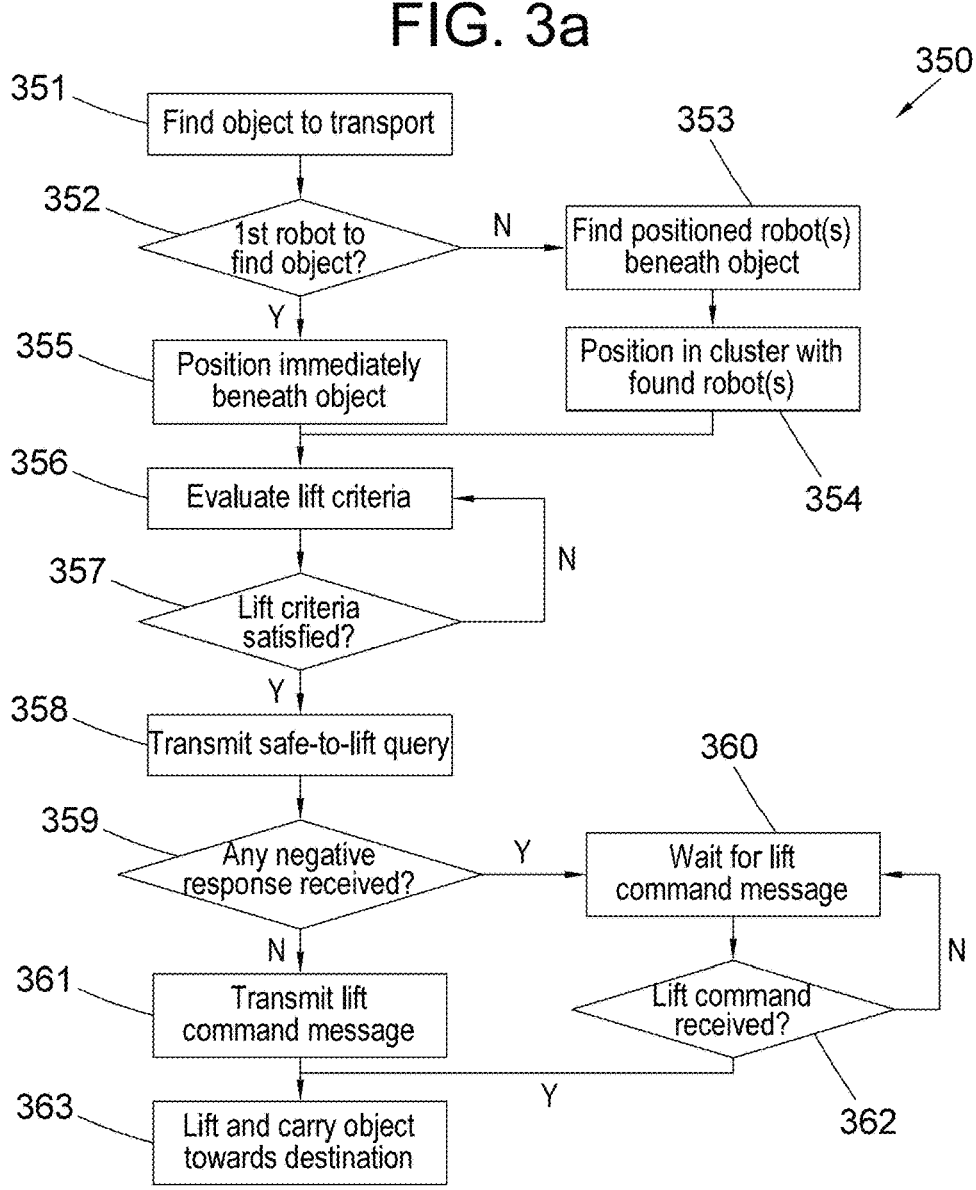
FIG. 3b is a flowchart of an embodiment of a method for lifting and carrying an object.

FIG. 3b shows a flowchart of steps performed by an individual robot in a specific example 350 embodiment of a method 300 as described with reference to FIG. 3a for carrying an object using a multi-robot system comprising a plurality of robots configured to lift and carry an object.

In the example method 350 shown in FIG. 3b, the one or more robots arranging themselves to apply respective transporting forces to an object is performed by each individual robot of the one or more robots finding 351 the object to transport and determining 352 whether they are the first robot to find the object. If the robot is the first robot to find the object, it positions itself immediately 355 beneath the object, and if it is not it finds 353 one or more other previously positioned robots beneath the object and positions 354 itself in a cluster with those robots.

After the robot positions 355, 354 beneath the object it evaluates 356 whether it satisfies lift criterion 357. If the robot satisfies 357 the lift criterion, it transmits 358 a safe-to-lift query to the other robots beneath the object and if it does not, it continues to evaluate 356 the lift criterion until it does.

After the robot transmits 358 a safe-to-lift criterion, if it receives 359 any negative responses it proceeds to wait 360 to receive a lift command message and if it does not, it transmits 361 a lift command message to other robots that responded positively to the safe-to-lift query. After the robot transmits 361 or receives 362 a lift command message it lifts and carries 363 the object towards a destination.

The example method 350 described above with reference to FIG. 3b may comprise any of the optional features described above with reference to FIG. 3a. For example, the robot may transmit a leave position message if it does not transmit 361 or receive 362 a lift command message within a pre-set time of positioning 354, 355 itself under the robot, and to leave its position under the robot upon receiving or transmitting such a leave message.

Figure 7:
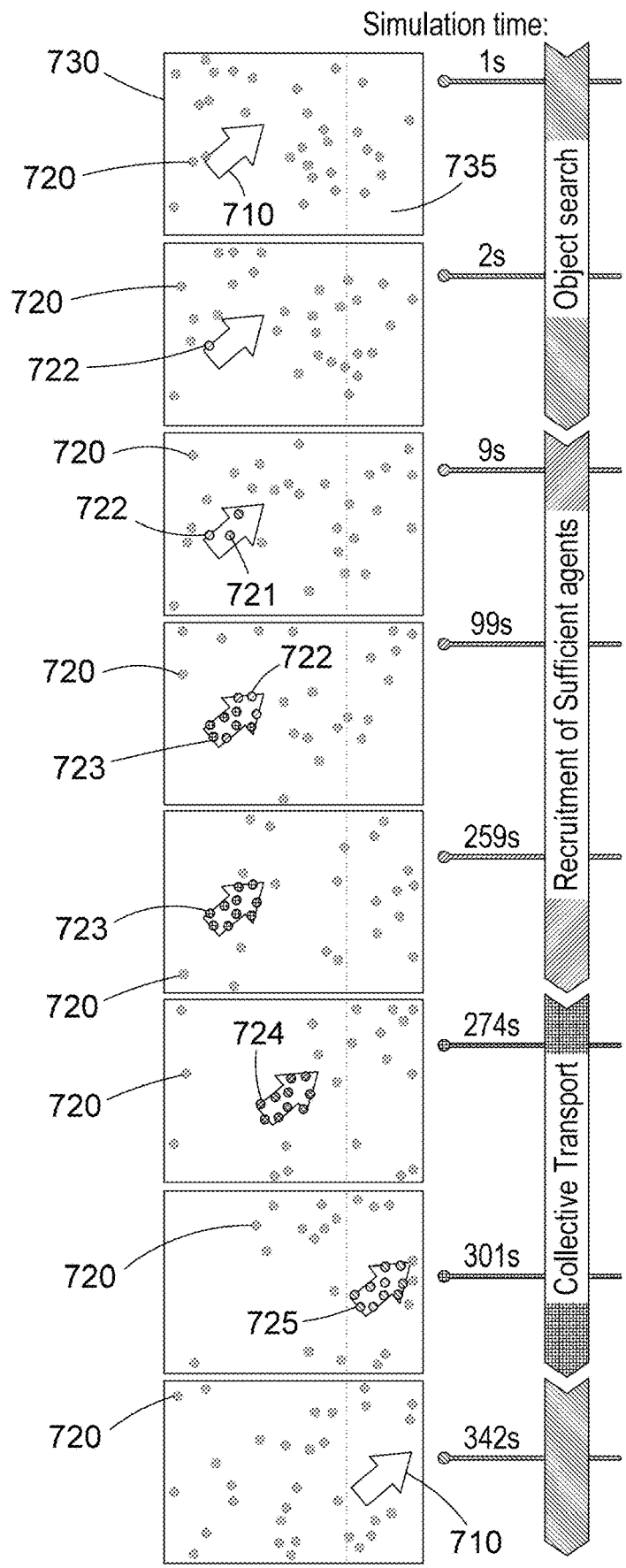
FIG. 7 shows an example of an object being transported using at a plurality of different points in time.

FIG. 7 is shows a simulation of an object 710 being transported using an embodiment of the method 350 as described above with reference to FIG. 3b at a plurality of different points in time 740, 741, 742, 743, 744, 745, 746, 747. The object 710 is arrow-shaped and has an area of 1.26 meters squared and a mass of 10.08 kilograms. The object is located within a five by seven meter rectangular environment 730 containing a two by five meter drop-off area 735 at one end.

The simulation is shown at eight illustrated points in time 740, 741, 742, 743, 744, 745, 746, 747 which have been selected for illustrative purposes. It will be appreciated that the actual time taken for the illustrated steps to be performed and the exact number and arrangement of the robots 720, 721, 722, 723, 724, 725 may vary in practice due to the random decentralised nature of the method of transporting the object 710.

The environment 730 contains a decentralised multi-robot system comprising thirty circular omnidirectional robots 720, 721, 722, 723, 724, 725 with diameters of 0.25 meters each configured to lift up to two kilograms. Therefore, at least six of the robots 720, 721, 722, 723, 724, 725 are required to safely lift and carry the object.

The environment 730, and the object 710 and robots 720, 721, 722, 723, 724, 725 therein are shown at eight different points in time after a request for the object 710 to be transported to the drop-off area 735 is received by the multi-robot system and propagated to all of the robots 720, 721, 722, 723, 724, 725 thereof.

At a first illustrated point in time 740, one second after the request is made, all thirty of the robots 720 move randomly within the environment 730 using a random walk behaviour at a simulated speed of 0.2 meters per second. At this illustrated first point in time 740, one of the plurality of walking robots 720 is adjacent the object 710 but has not yet moved underneath it. Robots 720 moving randomly within the environment 730 are shown as grey filled dots.

At a second illustrated point in time 741, two seconds after the request is made, the random movement of the robot 722 that was adjacent the object 710 has brought it underneath the object 710, at which point it has identified the object 710 as having been requested and has immediately positioned itself underneath the object 710. Robots 722 that have positioned themselves underneath the object, but which have not yet satisfied the lift criterion are shown as dots with diagonal bottom-left to top-right diagonal hatching.

When the robot 722 positions itself under the object it transmits a message that is propagated via the mesh network to all of the other robots 720 of the system, indicating that it has found, and has positioned itself under, the object 710. Upon receiving this message, the other robots 720 become aware that at least one robot 722 has found the object. Therefore, when these robots subsequently randomly move underneath and identify the object 710, they do not immediately position themselves upon doing so (as the first robot 722 did), but instead to move randomly beneath the object 710 until they find one or more positioned robots 722. These robots then position themselves within or at a pre-set distance from the previously positioned robots 722 such that they define or add to a well-distributed cluster of positioned robots. Such subsequent robots are therefore fully passively recruited to the cluster, without any communications being exchanged beyond the first robot's message that the object 710 has been found.

At a third illustrated point in time 742, nine seconds after the request is made, two further robots 721 have moved underneath, and found, the object 710. These two robots 721 are moving randomly beneath the object and have not yet found the first positioned robot 722 and positioned themselves in a cluster with it. Robots 721 that have found the object 710 and are randomly moving beneath it, but which have not yet positioned themselves, are shown as dots with diagonal top-left to bottom-right diagonal hatching.

At the third illustrated point in time 742, the first single positioned robot 722 is evaluating whether it satisfies the lift criterion. In the illustrated example, the lift criterion requirements are satisfied by a positioned robot if four or more other robots have positioned themselves within 0.6 meters of it, or if five or more robots that have not found the object have moved within 0.4 meters since it positioned itself. At the third illustrated point in time 742, neither of these requirements are met and the lift criterion is therefore not satisfied.

At a fourth illustrated point in time 743, ninety-nine seconds after the request is made, the two robots that were moving randomly beneath the object in the second illustrated point in time 742, and seven further robots that have subsequently found the object 710 have found the first positioned robot and have positioned themselves in a cluster. The cluster substantially spans the footprint of the object 710, such that none of the remaining robots 720 walking randomly within the environment 730 will be able to move under the object 710 due to a minimum separation being maintained between robots during their random movement.

Six robots 723 of the cluster of positioned robots 722, 723 have satisfied the lift criterion since positioning themselves. Upon satisfying the lift criterion, a positioned robot 723 switches to a safe-to-lift state, and transmits a lift query that is received or relayed to each of the other robots below that object 721, 722, 723, including positioned robots 722, 723 and any robots 721 moving beneath the object to find the cluster of positioned robots 722, 723. Each of the robots 721, 722, 723 that receive the message respond specifying whether they have satisfied the lift criterion. Each of the six criterion-satisfying robots 723 shown at time 743 have switched to the safe to lift state, transmitted a lift query, and received at least one negative response to its query from the other robots 721, 722 that were under the object 710 at the time they transmitted the query, but which had not satisfied the lift criterion. The most recent of these six robots 723 to satisfy the lift criterion transmitted a lift query and received a negative response to its query from each of the four robots 722 positioned under the object 710 at the fourth illustrated point in time 743 which was in such a position when it satisfied the lift criterion. Upon receiving one or more negative responses to its lift query, each criterion-satisfying safe-to-lift robot 723 does not initiate a lift and instead waits for other positioned robots 722 to satisfy the lift criterion and transmit their own queries. Robots 723 that have positioned themselves and satisfied the lift criterion are shown as dots with vertical and horizontal crosshatching.

The fifth illustrated point in time 744, two hundred and fifty nine seconds after the request is made, is the point in time at which the last of the positioned robots 723 has satisfied the lift criterion and has received only positive responses to its query. It therefore transmits a lift command that is received or relayed to each of the other criterion-satisfying positioned robots 723, causing the plurality of criterion-satisfying positioned robots 723 to substantially simultaneously lift the object 710.

The object is not lifted until ten robots have positioned themselves under the object spanning the footprint of the object to provide a stable lift of the object and having a total lift capacity of 20 kg exceeding the mass of the object 710.

After lifting the object, each of the object-carrying robots 724 moves in a direction from the object's original location towards the drop-off area 735, thereby exerting respective transporting forces on the carried object 710 in this direction. The respective transporting forces exerted by each of the object-carrying robots 724 result in a net force on the object 710 towards the drop off area. The sixth illustrated time point 745, two hundred and seventy four seconds after the request is made, the object 710 and the ten object-carrying robots 724 are part way between the object's start location and the drop-off area 735. Robots 724 carrying the object are shown as dots with diagonal crosshatching.

The object-carrying robots 724 continue to move in the direction from the object's original location towards the drop-off area 735 until one or more of the robots receive a stop message, which they relay to all of the other object-carrying robots 724. The stop message is transmitted by network host within a subsection of the drop-off area 735 towards the right edge of the environment 730 such that it is only received by robots that have travelled at least a minimum distance into the drop-off area 735, thereby ensuring that the object has been transported sufficiently into the drop-off area 735. The size of this subsection of the drop-off area may be selected based on the size of objects 710 to be transported within the environment 730 so as to ensure that the objects are carried sufficiently, or entirely into the drop-off area 735.

At the seventh illustrated time point 746, three hundred and one seconds after the request is made, the plurality of object-carrying robots have carried the object to and part way across the drop-off area in the direction from the object's original location towards the drop off area, until one of the robots entered the subsection of the drop-off area 735 and received the stop message. This robot has relayed it to the other object-carrying robots, triggering the object-carrying robots to substantially simultaneously put down the object 710 within the drop-off area.

After putting down the object 710, the plurality of robots 725 that previously carried the object resume moving randomly within the environment such that they eventually leave the footprint of the object. Robots 725 moving randomly beneath the object to leave the object are shown as dots diagonal top-left to bottom-right diagonal hatching.

At the eighth illustrated time point 747, three hundred and forty two seconds after the request is made, all of the ten robots that carried the object 710 have moved out from under the object as part of their random movement. All thirty robots 720 of the multi-robot system are therefore moving randomly within environment waiting for further request for objects and/or searching for other requested objects to transport.

Figure 8:
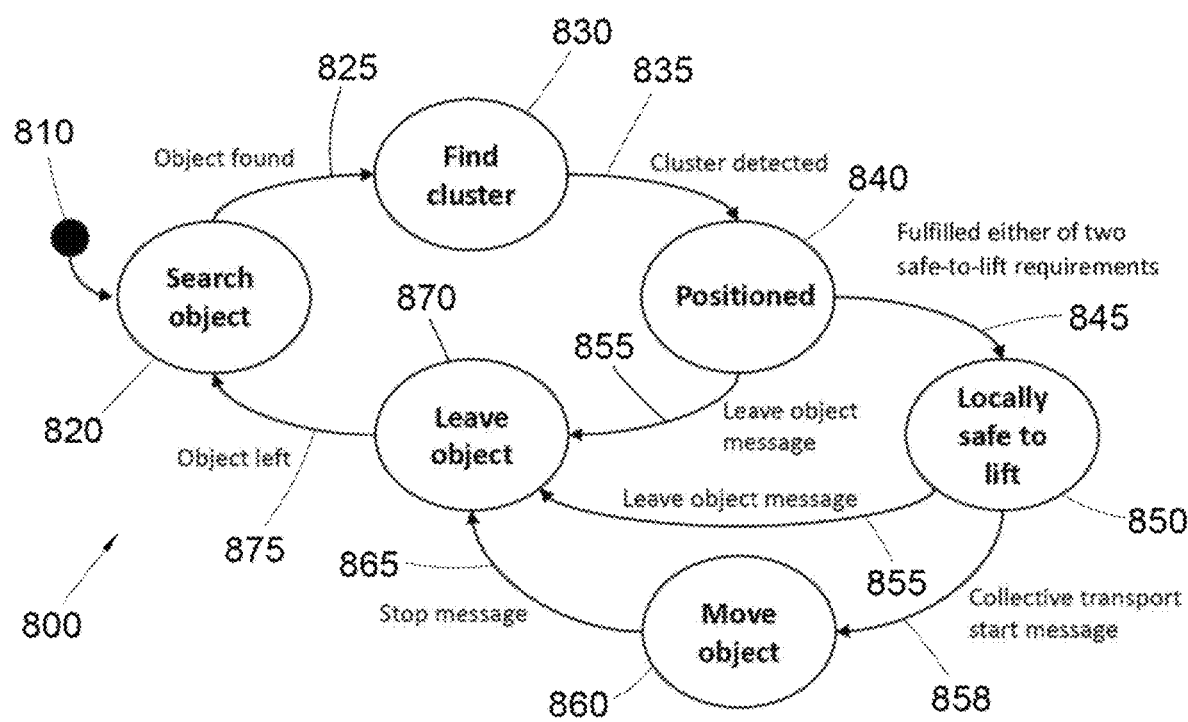
FIG. 8 is an example finite state machine of a robot.

FIG. 8 shows an example of a finite state machine 800 of a single robot of a decentralized multi-robot system for carrying objects such as a robot implementing a method 350 as described above with reference to FIG. 3b.

In the illustrated finite state machine 800, the robot has six possible states: searching for an object 820, finding a cluster 830, positioned 840, locally safe to lift 850, moving an object 860, and leaving an object 870.

The initial state 810 of the robot is searching for an object 820, in which the robot moves within an environment until it detects and moves underneath an object to be transported.

In some embodiments, the robot may move randomly within the environment until it detects an object to be transported. Alternatively, the robot may move partially or entirely in response to detections of the environment and/or objects therein, communications from other robots, and/or memories of such detections and/or communications.

In some embodiments the robot may determine whether any objects that it moves beneath is an object to be transported. In such embodiments, when the robot determines that an object it has moved beneath is an object to be transported it may switch to the find cluster state 830. In other embodiments, the robot may determine whether any object that it encounters or detects is an object to transport, and if so, may move underneath that object before switching to the find cluster state 830.

Upon entering the find cluster state 830 the robot checks whether it has previously received a message from another robot indicating that said other robot has previously found the object (preferably within a pre-set preceding time period) and if it has not, switches directly to the positioned state 840. If the robot has received such a message it remains in the find cluster state 830, in which it moves randomly beneath the object until it detects 835 one or more previously positioned robots under the object, at which stage it switches to the positioned state 840 joining a cluster define by the positioned robots. It will be appreciated that searching for a cluster here includes searching for only a single positioned robot.

In the positioned state 840, the robot evaluates whether it satisfies either of a first safe-to-lift criterion requirement (at least a pre-set number of other robots positioning themselves within a threshold distance of it) or a second safe-to-lift criterion requirement (at least a pre-set number of robots searching for the object having moved within a threshold distance of it since it positioned itself). If either of the two safe-to-lift criterion requirements are satisfied 845 the robot switches to a locally safe to lift state 850, at which point it transmits a lift query message to all other robots beneath the same object. These agents are either in the find cluster state 830, positioned state 840, or locally safe to lift state 850. Each robot that receives a lift query message responds with a negative not-safe-to-lift response message if it is in the find cluster state 830 or the positioned state 840, or responds with a positive safe-to-lift message if it is in the locally safe to lift state 850.

If a robot that transmits a lift query upon entering the locally safe to lift state 850 receives a positive safe-to-lift response from every other robot in the cluster, it transmits a collective transport start message 858. Upon transmitting or receiving a collective transport start message 858, a robot switches to the move object state 860. If a robot that transmits a lift query upon entering the locally safe to lift state 850 receives one or more negative not-safe-to-lift response messages it remains in the locally safe to lift state 850 and waits to receive lift query messages from other robots, to which it responds positively, and to receive a collective transport start message 858 from the last robot to at fulfil 845 either of the two safe-to-lift criterion requirements.

If a robot is still in the positioned state 840 or the locally safe-to-lift state 850 when at a pre-set timeout time after it enters the positioned state 840, it transmits a leave object message to all other robots in the cluster. Upon transmitting or receiving a leave object message 855 while in the positioned state 840 or the locally safe-to-lift state 850, a robot switches to the leave object state 870. In the leave object state 870 the robots move out from underneath the object 875 (for example, randomly, based on observations of the environment, object, and/or other robots, or upon memory of a path taken when moving under the object), at which point they switch back to the searching for an object state 820.

Upon switching to the move object state 860 a robot lifts the object it is positioned beneath. When in the move object state 860, the robot moves towards a destination such as a drop-off area. The robot may default to moving in a direction towards the destination, but may deviate temporarily from doing so to avoid objects, which may be detected by one or more of the robots carrying the object. The robot may control its directional movement using a digital compass comprised by the robot.

Upon receiving a stop message 865, the robot puts down the object and switches to the leave object state 870. Such a stop message may be transmitted by a network host within a destination area and a robot of the cluster that receives the stop message 865 relays it to the other robots of the cluster, such that all of the robots in the move object state 860 put down the object substantially simultaneously (for example, at times separated by only negligible communication latencies). Upon receiving a stop message, one or more robots may also communicate to other robots of the system that they have transported the object to its destination.

It will be appreciated that the robot may have one or more additional states. For example, a robot may have an awaiting request state which it enters when it has no outstanding requests for objects to be transported. In such an awaiting request state, the robot may move randomly within the environment, may stop and wait to conserve energy, or may explore the environment and store locations of objects which it identifies, in order to facilitate finding those objects if they are requested in future. Such a robot may switch from such an awaiting request state to the searching for object 810 when it receives a request, and may switch to either the awaiting request state or the searching for object state 810 upon leaving an object 875 in dependence upon whether it has any outstanding requests to transport an object.

Figure 9:
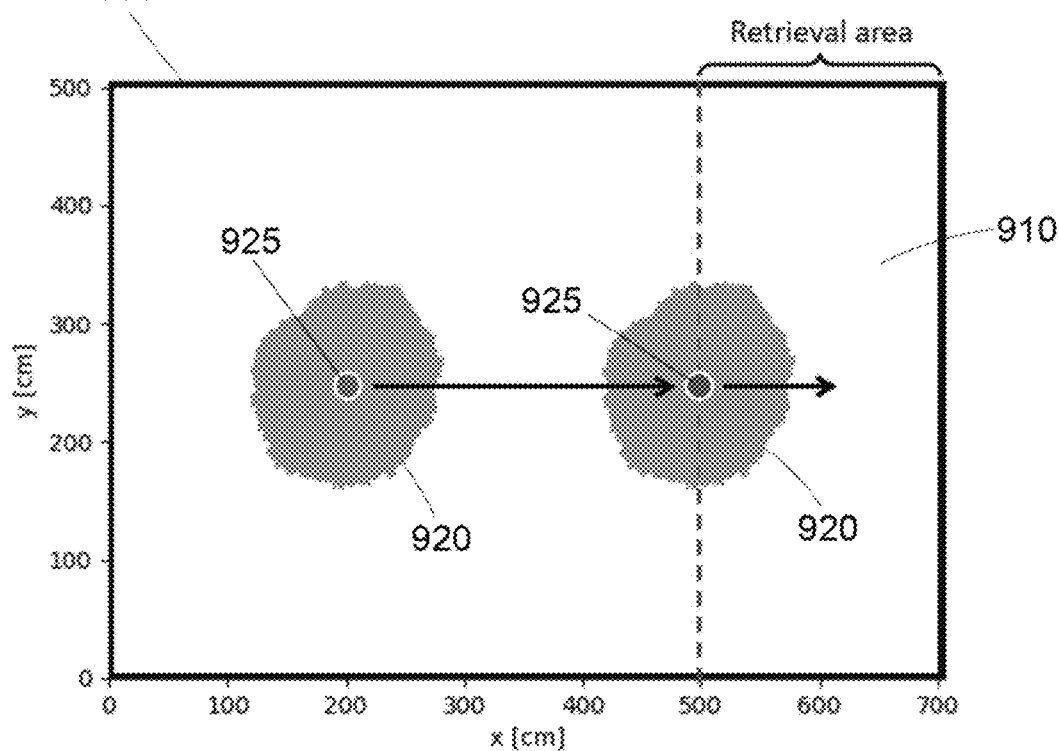
FIG. 9 is an example of a simulation of the transport of an object using a multi-robot system.

FIG. 9 shows one example of a plurality of simulations of the transport of an object using a decentralized multi-robot system whose results are shown in FIGS. 10 and 11. The simulations simulate a decentralized multi-robot system operating as described above with reference to FIG. 7 in order to evaluate such a system's performance.

Each of the simulations simulates the transport of an irregularly shaped object 920 within a seven by five meter environment 900 containing a two by five meter drop-off area 910 at one end using a decentralized multi-robotsystem.

Between different simulations of the plurality of simulations, the number of robots in the decentralized multi-robot system and the size and shape of the object were varied.

In each of the simulations, the multi-robot system comprises a plurality of omnidirectional robots with circular cross sections of 0.25-meter diameters each capable of lifting two kilograms. The robots are initialised with random orientations in random locations within the environment 900 outside the footprint of the object 920. The robots moved at a speed of 0.2 meters per second and maintained a minimum separation of 0.4 meters between each other. The number of robots in the system was varied between twenty and forty in steps of five robots between different simulations.

In each of the simulations, the object 920 has a randomly generated arbitrary shape and orientation, a density of eight kilograms per meter squared, and is initialised with its centre of mass at x and y coordinates of 2 meters and 2.5 meters respectively. The size of the object was varied between 1.5 and 3.5 square meters in steps of 0.5 square meters between different simulations. These are typical sizes of objects such as home appliances, gym equipment, or furniture. In the example simulation shown in FIG. 9, the object 920 has an area of two square meters, and therefore a weight of sixteen kilograms. The shapes of the objects were generated using an algorithm operating using a region growing procedure that added pixels to an existing cluster in a random fashion until the object reached its desired area.

In each of the simulations, when carrying the robots carried the object they moved in the positive x direction, directly towards the closest point of the edge of the drop-off area 910. Ten simulations were performed for each combination of object size and number of robots.

In order to evaluate the performance of the multi-robot system in each simulation, whether it successfully transported the object 920 such that its centre of mass 925 entered the drop-off area 910 within a time limit of twenty minutes was evaluated. Additionally, if the centre of mass 925 of the object 920 was successfully transported to the drop-off area 910 as described above, the time taken to do so, and the number of robots that carried the object were recorded. If the centre of mass 925 of the object 920 was not transported to the drop-off area 910 as described above, the time recorded was twenty-minutes.

FIG. 10 is a graph 1000 showing the number of simulations in which a given number of robots transported the object in the simulations using each combination of object size and number of robots.

The graph 1000 is divided into twenty-five columns, each corresponding to a specific combination of object size 1020 and number of robots in the system 1030 at which ten simulations were performed. Each consecutive group of five columns corresponds to a specific object size as shown on the lower x-axis and contains one column for each number of robots in increasing order as shown on the upper x-axis 1030.

Each row of the graph 1000 corresponds to a different number of robots carrying the object to the drop-off area, as shown on the y-axis 1010. A number at the intersection of a row and column indicates the number of simulations with the object size and number of robots in the system specified by the column, in which the number of robots corresponding to the row carried the object to the drop-off area.

For example, the first column of the graph 1000 shows the results of the ten simulations performed with randomly shaped objects with areas of 1.5 meters squared using a system with twenty robots. In one of the simulations, nine robots carried the object to the drop-off area, in four of the simulations, ten robots carried the object to the drop-off area, in another four of the simulations, eleven robots carried the object to the drop-off area, and in the remaining simulation, twelve robots carried the object to the drop-off area.

The bottom row of the graph 1000, which corresponds to zero robots carrying the object gives the number of runs for each respective column in which the multi-robot system did not transport the object to the drop-off area within the twenty minutes that were simulated. For example, the number six at the intersection of the bottom row with the sixth column, which corresponds to an object size of two meters squared and a system comprising twenty robots, shows that in six of the ten simulations with this combination of object size and number of robots did not result in the object being transported to the drop-off area within the simulated 20-minute period.

The horizontal line 1040 across each group of five columns corresponding to a given object size indicates the theoretical minimum number of the simulated robots required to transport the object of that size, based on the simulated two kilogram lifting capacity of each robot and the simulated density of eight kilograms per square meter of the simulated objects. It will be appreciated that different systems with greater lifting capacities could safely carry the object with fewer robots.

As shown objects with areas of 1.5 square meters were reliably transported by systems comprising any number of robots, with larger objects being successively less likely to be transported. Increasing the number of robots in the system generally increased the likelihood of the objects being successfully and safely transported to the drop-off area.

FIG. 11 is a graph 1100 of the average times taken for the object to be transported to the drop-off area in the simulations using each combination of object size and number of robots.

Each column of the graph 1100 corresponds to a different object size as shown on the x-axis 1120 and each row corresponds to a system with a different number of robots, as shown on the y-axis 1110. The number at each intersection is the average time in seconds for the system of robots to transport the object to the drop-off area.

In order to calculate the averages, the maximum time of twelve-hundred seconds was used as the time for simulations in which the object was not transported to the drop-off area within the simulated twenty-minute period, due to the robots of the simulated multi-robot system not determining that they had formed a cluster that was safe to lift the object. As shown in FIG. 10, multi-robot systems comprising only twenty robots were unable to successfully transport objects with footprints of area 2.5 square meters or more, and a system comprising twenty-five robots was unable to transport an object with a footprint of area 3.5 square meters.

Increasing the number of robots in the system transporting the objects, increases the probability of robots finding the object at any given time, thereby increasing the rate at which a number of robots sufficient to carry the object find it. Additionally, increasing the number of robots increases the number of robots randomly walking outside the footprint of the object, thereby increasing the rate at which robots that have positioned themselves at the edge of the footprint satisfy their lift criterion. Therefore, as shown in FIGS. 10 and 11 systems comprising greater numbers of robots are generally more likely to transport objects to the drop-off area and generally to take less time to do so.

As described above, increasing the number of robots randomly walking outside the footprint of the object increases the rate at which robots that have positioned themselves at the edge of the footprint satisfy their lift criterion. However, the number of robots randomly walking outside the footprint of the object decreases as more robots find objects to transport. Therefore, in some embodiments, the number of robots may be varied dynamically, which may offset this.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of transporting an object using a system comprising a plurality of robots, the method comprising:
    one or more robots of the plurality of robots arranging themselves to each exert a respective transporting force on the object;
    each of the one or more robots evaluating whether it satisfies a transport criterion while arranged to exert the respective transporting force on the object; and if all of the one or more robots satisfy the transport criterion, the one or more robots exerting the respective transporting forces on the object to transport the object towards a destination,
wherein at least one of the one or more robots evaluates whether it satisfies the transport criterion based on observations of other robots of the plurality of robots within its vicinity,
the one or more robots arranging themselves comprises each of the robots positioning themselves beneath the object to lift the object, and
a robot of the one or more robots satisfies the transport criterion if at least a pre-set number of other robots of the one or more robots are positioned within a first threshold distance from the robot of the one or more robots.

2. A method according to claim 1, wherein the one or more robots are a set of the plurality of robots.

3. A method according to claim 2, wherein upon each of the set of robots evaluating that it satisfies the transport criterion, it transmits a query message to other robots arranged to apply respective transporting forces to the object, each of which respond indicating whether or not it satisfies the transport criterion.

4. A method according to claim 1, wherein the at least a pre-set number of other robots are the plurality of robots that have not moved underneath the object and the at least a pre-set number of other robots move within a second threshold distance of the robot of the one or more robots.

5. A method according to claim 2, wherein the one or more robots arranging themselves comprises a first robot of the set of robots positioning itself to exert the respective transporting force on the object, and each subsequent robot of the set of robots positioning itself to exert the respective transporting force on the object within a third threshold distance of one or more robots of the set of robots that have already positioned themselves underneath the object.

6. A method according to claim 1, wherein if at least one of the one or more robots does not satisfy the transport criterion, the one or more robots do not exert respective transporting forces on the object to transport the object towards a destination.

7. A method according to claim 1, wherein if the one or more robots do not all satisfy the transport criterion at a pre-set time after a first robot of the one or more robots arranges itself to apply the respective transporting force on the object, the one or more robots leave the object.

8. A method according to claim 1, comprising the one or more robots moving within an environment until they identify the object before they arrange themselves to each apply the respective transporting force to the object.

9. A method according to claim 1, wherein the one or more robots exerting the respective transporting forces on the object comprises the robots lifting and carrying the object, and
the one or more robots are a set of robots.

10. A robot comprising a processor, one or more non-transitory storage media, a drive, an edge of the robot, wherein the non-transitory storage medium comprises computer instructions executable by the processor, the computer instructions when executed by the processor causing the robot to:
arrange itself using the drive to exert a respective transporting force on an object using the edge;
subsequently evaluate whether it satisfies a transport criterion based on observations of other robots in its vicinity;
communicate with any other robots that have arranged themselves to exert respective transporting forces on the object and determine whether all of the any other robots satisfy the transport criterion; and
if the robot and all of the any other robots satisfy the transport criterion, exert the respective transporting force on the object to transport the object towards a destination,
wherein the robot arranging itself comprises the robot positioning itself beneath the object to lift the object, and
the robot satisfies the transport criterion if at least a pre-set number of other robots are positioned within a first threshold distance from the robot.

11. A robot according to claim 10, wherein the computer instructions when executed by the processor further cause the robot to, if the robot satisfies the transport criterion, transmit a query message to any other robots arranged to exert respective transporting forces on the object; and to, if the robot receives a query message, respond indicating whether or not it satisfies the transport criterion.

12. A robot according to claim 10, wherein the at least a pre-set number of other robots are the plurality of robots that have not moved underneath the object, and the at least a pre-set number of other robots move within a second threshold distance of the robot.

13. A robot according to claim 10, wherein the robot arranging itself comprises the robot positioning itself to exert a respective transporting forces on the object, and wherein if one or more other robots are already positioned to exert respective transporting forces on the object, the robot positions itself within a third threshold distance of one or more of the one or more other robots.

14. A robot according to claim 10, wherein the computer instructions when executed by the processor further cause the robot to, if a pre-set time elapses after the robot arranges itself to exert the respective transporting force on the object, to leave the object and to transmit a message commanding any other robots arranged to exert respective transporting forces on the object to leave the object.

15. A robot according to claim 10, wherein the computer instructions when executed by the processor further cause the robot to move within an environment until it identifies the object before it arranges itself to apply the respective transporting force on the object.

16. A decentralized system comprising a plurality of robots according to claim 10.

17. A robot according to claim 10, wherein the robot exerting the respective transporting force on the object comprises the robot lifting and carrying the object.

18. One or more non-transitory storage media comprising computer instructions executable by a processor of a robot, the computer instructions when executed by the processor causing the robot to:
arrange itself to apply a transporting force on an object;
subsequently evaluate whether it satisfies a transport criterion based on observations of other robots in its vicinity;
communicate with any other robots that have arranged themselves to exert a transporting force on the object and determine whether all of the any other robots satisfy the transport criterion; and
if the robot and all of the any other robots satisfy the transport criterion, transport the object towards a destination, wherein the robot arranging itself comprises the robot positioning itself beneath the object to lift the object, and the robot satisfies the transport criterion if at least a pre-set number of other robots are positioned within a first threshold distance from the robot.

19. One or more non-transitory storage media according to claim 18, wherein the at least a pre-set number of other robots are the plurality of robots that have not moved underneath the object, and the at least a pre-set number of other robots move within a second threshold distance of the robot.

20. One or more non-transitory storage media according to claim 18, wherein the robot exerting the respective transporting force on the object comprises the robot lifting and carrying the object.

* * * * *